(12) United States Patent
Sasada

(10) Patent No.: US 12,521,967 B2
(45) Date of Patent: Jan. 13, 2026

(54) LAMINATE AND POLYMER FILM

(71) Applicant: FUJIFILM Corporation, Tokyo (JP)

(72) Inventor: Yasuyuki Sasada, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 319 days.

(21) Appl. No.: 18/329,553

(22) Filed: Jun. 5, 2023

(65) Prior Publication Data
US 2023/0311453 A1 Oct. 5, 2023

Related U.S. Application Data

(63) Continuation of application No. PCT/JP2021/047404, filed on Dec. 21, 2021.

(30) Foreign Application Priority Data

Dec. 21, 2020 (JP) .................. 2020-211786

(51) Int. Cl.
*B32B 15/08* (2006.01)
*B32B 27/20* (2006.01)

(52) U.S. Cl.
CPC ............ *B32B 15/08* (2013.01); *B32B 27/205* (2013.01); *B32B 2250/02* (2013.01); *B32B 2305/55* (2013.01); *B32B 2307/204* (2013.01); *B32B 2457/08* (2013.01)

(58) Field of Classification Search
None
See application file for complete search history.

(56) References Cited

U.S. PATENT DOCUMENTS

| | | | | |
|---|---|---|---|---|
| 4,161,470 A | * | 7/1979 | Calundann | C08G 63/065 528/206 |
| 2009/0200071 A1 | | 8/2009 | Morita et al. | |
| 2011/0287243 A1 | * | 11/2011 | Carney | H05K 9/0088 428/339 |
| 2013/0065018 A1 | * | 3/2013 | Park | H05K 1/036 428/458 |

FOREIGN PATENT DOCUMENTS

| | | | | |
|---|---|---|---|---|
| JP | H08250860 | | 9/1996 | |
| JP | H08250860 A | * | 9/1996 | ............. B32B 15/08 |
| JP | 2006192800 | | 7/2006 | |
| JP | 2006192800 A | * | 7/2006 | ............. B29C 41/28 |
| JP | 2008137178 | | 6/2008 | |
| JP | 2008137178 A | * | 6/2008 | ............. B32B 15/08 |
| JP | 2008291156 | | 12/2008 | |
| JP | 2009007576 | | 1/2009 | |
| JP | 2014526399 | | 10/2014 | |
| JP | 2020109166 | | 7/2020 | |
| WO | 2017150336 | | 9/2017 | |
| WO | WO-2017150336 A1 | * | 9/2017 | ............. C08L 101/00 |
| WO | 2018061727 | | 4/2018 | |

OTHER PUBLICATIONS

Thomas—effect of inorganic fillers on CTE of polymers—AD0287826—1960 (Year: 1960).*
Culbertson—laminate material for PCB—LCP—IEEE—1995 (Year: 1995).*
Watanabe—JP H08-250860 A—PCT D3—MT—laminate board—1996 (Year: 1996).*
Ono—JP 2006-192800 A—PCT D2—MT—multilayer polyimide film—2006 (Year: 2006).*
Watanabe—JP 2008-137178 A—PCT D1—MT—laminate w-metal layer—2008 (Year: 2008).*
Celanese—LCP-026_Vectra LCP Short Term Prop Guide TG_AM—2013 (Year: 2013).*
Taguchi—WO 2017-150336 A1—PCT D6—MT—resin w-LCP particles—2017 (Year: 2017).*
"International Search Report (Form PCT/ISA/210) of PCT/JP2021/047404," mailed on Mar. 15, 2022, with English translation thereof, pp. 1-7.
"Written Opinion of the International Searching Authority (Form PCT/ISA/237) of PCT/JP2021/047404," mailed on Mar. 15, 2022, with English translation thereof, pp. 1-10.
"Notice of Reasons for Refusal of Japan Counterpart Application", issued on Oct. 7, 2025, with English translation thereof, p. 1-p. 9.

* cited by examiner

*Primary Examiner* — John Vincent Lawler
(74) *Attorney, Agent, or Firm* — JCIPRNET

(57) ABSTRACT

Provided are a laminate including a polymer film in which a linear expansion coefficient of at least one surface X is smaller than a linear expansion coefficient of an inside and a metal layer or a metal wire, which is provided on a surface Y side opposite to the surface X of the polymer film; and a polymer film in which a linear expansion coefficient of at least one surface X is smaller than a linear expansion coefficient of an inside.

14 Claims, No Drawings

LAMINATE AND POLYMER FILM

CROSS-REFERENCE TO RELATED APPLICATIONS

This application is a continuation application of International Application No. PCT/JP2021/047404, filed Dec. 21, 2021, the disclosure of which is incorporated herein by reference in its entirety. Further, this application claims priority from Japanese Patent Application No. 2020-211786, filed Dec. 21, 2020, the disclosure of which is incorporated herein by reference in its entirety.

BACKGROUND OF THE INVENTION

1. Field of the Invention

The present disclosure relates to a laminate and a polymer film.

2. Description of the Related Art

In recent years, frequencies used in a communication equipment tend to be extremely high. In order to suppress transmission loss in a high frequency band, insulating materials used in a circuit board are required to have a lowered relative permittivity and a lowered dielectric loss tangent.

In the related art, polyimide is commonly used as the insulating material used in the circuit board, a liquid crystal polymer which has high heat resistance and low water absorption and is small in loss in the high frequency band has been attracted.

As a method for manufacturing a prepreg in the related art, for example, JP2008-291156A discloses a method for manufacturing a prepreg, including a step of transporting a long base material and infusing the base material with resin varnish in a dipping tank, in which first and second dip rolls forming a rotation axis in a direction perpendicular to a transport direction of the base material are arranged in the resin varnish, an upper peripheral surface of the first dip roll is brought into contact with a lower surface of the base material, and then a lower peripheral surface of the second dip roll is brought into contact with an upper surface of the base material to infuse the base material with the resin varnish.

In addition, as a resin composition used in manufacturing a laminated plate in the related art, a resin composition disclosed in JP2009-7576A has been known.

JP2009-7576A discloses a resin composition used for manufacturing a laminated plate, that contains an insulating resin having an aromatic ring, in which a molecular weight between crosslinking points of the insulating resin, which is obtained from a shear elastic modulus of the insulating resin having an aromatic ring at Tg or higher, is 300 to 1,000 after the laminated plate is manufactured.

SUMMARY OF THE INVENTION

An object to be achieved by an aspect of the present invention is to provide a laminate excellent in breaking strength of a polymer film and in resistance to warping.

An object to be achieved by another aspect of the present invention is to provide a polymer film having excellent breaking strength and resistance to warping.

The methods for achieving the above-described objects include the following aspects.

<1> A laminate comprising:
a polymer film in which a linear expansion coefficient of at least one surface X is smaller than a linear expansion coefficient of an inside; and
a metal layer or a metal wire, which is provided on a surface Y side opposite to the surface X of the polymer film.

<2> The laminate according to <1>,
in which a thermal expansion coefficient of the surface X is −20 ppm/K to 50 ppm/K.

<3> The laminate according to <1> or <2>,
in which a thermal expansion coefficient of the surface Y is 10 ppm/K to 200 ppm/K.

<4> The laminate according to any one of <1> to <3>,
in which the polymer film contains a polymer having a dielectric loss tangent of 0.01 or less.

<5> The laminate according to <4>,
in which the polymer having a dielectric loss tangent of 0.01 or less is a fluorine-based polymer.

<6> The laminate according to <4>,
in which the polymer having a dielectric loss tangent of 0.01 or less is a liquid crystal polymer.

<7> The laminate according to <6>,
in which the polymer having a dielectric loss tangent of 0.01 or less includes a liquid crystal polymer having a structural unit represented by any of Formulae (1) to (3), $$—O—Ar^1—CO—$$  Formula (1)

$$—CO—Ar^2—CO—$$  Formula (2)

$$—X—Ar^3—Y—$$  Formula (3)

in Formulae (1) to (3), $Ar^1$ represents a phenylene group, a naphthylene group, or a biphenylylene group, $Ar^2$ and $Ar^3$ each independently represent a phenylene group, a naphthylene group, a biphenylylene group, or a group represented by Formula (4), X and Y each independently represent an oxygen atom or an imino group, and hydrogen atoms in $Ar^1$ to $Ar^3$ may be each independently substituted with a halogen atom, an alkyl group, or an aryl group, $$—Ar^4—Z—Ar^5—$$  Formula (4)

in Formula (4), $Ar^4$ and $Ar^5$ each independently represent a phenylene group or a naphthylene group, and Z represents an oxygen atom, a sulfur atom, a carbonyl group, a sulfonyl group, or an alkylene group.

<8> The laminate according to any one of <4> to <7>,
in which a melting point Tm or a 5%-by-mass-loss temperature Td of the polymer having a dielectric loss tangent of 0.01 or less is 200° C. or higher.

<9> The laminate according to any one of <1> to <8>,
in which the polymer film includes a layer A and a layer B provided on at least one surface of the layer A.

<10> The laminate according to <9>,
in which a linear expansion coefficient of a surface of the layer B, which is opposite to the layer A side, is −20 ppm/K to 50 ppm/K.

<11> The laminate according to <9> or <10>,
in which the layer B contains a filler.

<12> The laminate according to any one of <1> to <11>,
in which a peel strength between the polymer film and the metal layer or the metal wire is 0.5 kN/m or more.

<13> A polymer film,
in which a linear expansion coefficient of at least one surface X is smaller than a linear expansion coefficient of an inside.

<14> The polymer film according to <13>,
in which a thermal expansion coefficient of the surface X is −20 ppm/K to 50 ppm/K.
<15> The polymer film according to <13> or <14>,
in which a thermal expansion coefficient of the surface Y is 10 ppm/K to 200 ppm/K.
<16> The polymer film according to any one of <13> to <15>,
in which the polymer film contains a polymer having a dielectric loss tangent of 0.01 or less.
<17> The polymer film according to <16>,
in which the polymer having a dielectric loss tangent of 0.01 or less is a fluorine-based polymer.
<18> The polymer film according to <16>,
in which the polymer having a dielectric loss tangent of 0.01 or less is a liquid crystal polymer.
<19> The polymer film according to <18>,
in which the polymer having a dielectric loss tangent of 0.01 or less includes a liquid crystal polymer having a structural unit represented by any of Formulae (1) to (3),

  Formula (1)

  Formula (2)

  Formula (3)

in Formulae (1) to (3), $Ar^1$ represents a phenylene group, a naphthylene group, or a biphenylylene group, $Ar^2$ and $Ar^3$ each independently represent a phenylene group, a naphthylene group, a biphenylylene group, or a group represented by Formula (4), X and Y each independently represent an oxygen atom or an imino group, and hydrogen atoms in $Ar^1$ to $Ar^3$ may be each independently substituted with a halogen atom, an alkyl group, or an aryl group,

  Formula (4)

in Formula (4), $Ar^4$ and $Ar^5$ each independently represent a phenylene group or a naphthylene group, and Z represents an oxygen atom, a sulfur atom, a carbonyl group, a sulfonyl group, or an alkylene group.
<20> The polymer film according to any one of <16> to <19>,
in which a melting point Tm or a 5%-by-mass-loss temperature Td of the polymer having a dielectric loss tangent of 0.01 or less is 200° C. or higher.
<21> The polymer film according to any one of <13> to <20>,
in which the polymer film includes a layer A and a layer B provided on at least one surface of the layer A.
<22> The polymer film according to <21>,
in which a linear expansion coefficient of a surface of the layer B, which is opposite to the layer A side, is −20 ppm/K to 50 ppm/K.
<23> The polymer film according to <21> or <22>,
in which the layer B contains a filler.

According to the aspect of the present invention, it is possible to provide a laminate excellent in breaking strength of a polymer film and in resistance to warping.

According to another aspect of the present invention, it is possible to provide a polymer film having excellent breaking strength and resistance to warping.

DESCRIPTION OF THE PREFERRED EMBODIMENTS

Hereinafter, the contents of the present disclosure will be described in detail. The description of configuration requirements below is made based on representative embodiments of the present disclosure in some cases, but the present disclosure is not limited to such embodiments.

Further, in the present specification, a numerical range shown using "to" indicates a range including numerical values described before and after "to" as a lower limit and an upper limit.

In a numerical range described in a stepwise manner in the present disclosure, an upper limit or a lower limit described in one numerical range may be replaced with an upper limit or a lower limit in another numerical range described in a stepwise manner. Further, in a numerical range described in the present disclosure, an upper limit or a lower limit described in the numerical range may be replaced with a value described in an example.

Further, in a case where substitution or unsubstitution is not noted in regard to the notation of a "group" (atomic group) in the present specification, the "group" includes not only a group that does not have a substituent but also a group having a substituent. For example, the concept of an "alkyl group" includes not only an alkyl group that does not have a substituent (unsubstituted alkyl group) but also an alkyl group having a substituent (substituted alkyl group).

In the present specification, the concept of "(meth)acryl" includes both acryl and methacryl, and the concept of "(meth)acryloyl" includes both acryloyl and methacryloyl.

Further, the term "step" in the present specification indicates not only an independent step but also a step which cannot be clearly distinguished from other steps as long as the intended purpose of the step is achieved. Further, in the present disclosure, "% by mass" has the same definition as that for "% by weight", and "part by mass" has the same definition as that for "part by weight".

Furthermore, in the present disclosure, a combination of two or more preferred embodiments is a more preferred embodiment.

Further, the weight-average molecular weight (Mw) and the number-average molecular weight (Mn) in the present disclosure are molecular weights converted using polystyrene as a standard substance by performing detection with a gel permeation chromatography (GPC) analysis apparatus using TSKgel SuperHM-H (trade name, manufactured by Tosoh Corporation) column, a solvent of pentafluorophenol (PFP) and chloroform at a mass ratio of 1:2, and a differential refractometer, unless otherwise specified.

(Laminate)

The laminate according to the embodiment of the present disclosure includes a polymer film in which a linear expansion coefficient of at least one surface X is smaller than a linear expansion coefficient of an inside, and a metal layer or a metal wire, which is provided on a surface Y side opposite to the surface X of the polymer film.

The present inventor has found that the laminate in the related art does not sufficiently satisfy both the breaking strength of the polymer film and the resistance to warping.

In addition, in a case where a filler is added to the polymer film in the related art to suppress the warping, the present inventor has found that the breaking strength is reduced.

As a result of intensive research conducted by the present inventor, it has been found that, with the above-described configuration, it is possible to provide a laminate excellent in breaking strength of a polymer film and in resistance to warping.

The detailed mechanism for obtaining the above-described effects is not clear, but assumed as follows.

In a polymer film in which a linear expansion coefficient of at least one surface X is smaller than a linear expansion coefficient of an inside, by disposing a metal layer or a metal wire on a surface Y side opposite to the surface X, it is presumed that warp moment due to the difference in linear expansion coefficient between the metal layer or the metal wire and the polymer film can be effectively suppressed, and the resistance to warping is excellent. In addition, with such a configuration, it is presumed that it is possible to reduce an amount of the filler and the like added, which is required to suppress the linear expansion coefficient of the polymer film, and it is also effective in improving the breaking strength of the polymer film.

In addition, by suppressing the warping of the laminate, it is possible to contribute to improvement of yield, for example, preventing an error during transportation.

~Metal Layer or Metal Wire~

The laminate according to the embodiment of the present disclosure includes a metal layer or the metal wire, which is provided on the surface Y side opposite to the surface X of the polymer film.

Here, the surface of the polymer film refers to an outer surface (a surface in contact with air or the substrate) of the polymer film, and the smaller of a range of 3 μm in a depth direction from the most surface and a range of 10% or less of the thickness of the entire polymer film from the most surface is defined as the "surface". The inside of the polymer film refers to a portion other than the surface of the polymer film, that is, an inner surface of the polymer film (a surface which is not in contact with air or the substrate), which is not limited. The smaller numerical value of a range of ±1.5 μm from a center of the polymer film in a thickness direction and a range of ±5% of the total thickness of the polymer film from the center in the thickness direction is defined as the "inside".

The metal layer or the metal wire described above may be a known metal layer or metal wire, but is, for example, preferably a copper layer or a copper wire.

In addition, it is preferable that the laminate according to the embodiment of the present disclosure does not include the metal layer or the metal wire on the above-described surface X side.

A method of attaching the polymer film to the metal layer or the metal wire is not particularly limited, and a known laminating method can be used.

A pressure in the above-described laminating is not particularly limited, but is preferably 0.1 MPa or more and preferably 0.2 MPa to 10 MPa.

In addition, a temperature in the above-described laminating can be appropriately selected depending on the polymer film or the like to be used, but is preferably 150° C. or higher, more preferably 280° C. or higher, and particularly preferably 280° C. or higher and 420° C. or lower.

A peel strength between the above-described polymer film and the metal layer or the metal wire described above is preferably 0.5 kN/m or more, more preferably 0.7 kN/m or more, still more preferably 0.7 kN/m to 2.0 kN/m, and particularly preferably 0.9 kN/m to 1.5 kN/m.

In the present disclosure, the peel strength between the polymer film and the metal layer or the metal wire (for example, the copper layer or the copper wire) is measured by the following method.

A peeling test piece with a width of 1.0 cm is produced from the laminate of the polymer film and the metal layer or the metal wire, the polymer film is fixed to a flat plate with double-sided adhesive tape, and the strength (kN/m) in a case of peeling the polymer film off from the metal layer or the metal wire at a rate of 50 mm/min is measured by the 180° method in conformity with JIS C 5016 (1994).

The metal layer is preferably a copper layer. As the copper layer, a rolled copper foil formed by a rolling method or an electrolytic copper foil formed by an electrolytic method is preferable, and a rolled copper foil is more preferable from the viewpoint of bending resistance.

The metal wire is preferably a copper wire. As the copper wire, a copper wire which is obtained by etching a rolled copper foil formed by a rolling method or an electrolytic copper foil formed by an electrolytic method is preferable, and a copper wire which is obtained by etching a rolled copper foil is more preferable from the viewpoint of bending resistance.

An average thickness of the metal layer or the metal wire, preferably the copper layer or the copper wire, is not particularly limited, but is preferably 2 μm to 20 μm, more preferably 3 μm to 18 μm, and still more preferably 5 μm to 12 μm. The copper foil may be copper foil with a carrier formed on a support (carrier) so as to be peelable. As the carrier, a known carrier can be used. An average thickness of the carrier is not particularly limited, but is preferably 10 μm to 100 μm and more preferably 18 μm to 50 μm.

It is also preferable that the metal layer in the laminate according to the embodiment of the present disclosure is processed into, for example, a desired circuit pattern by etching to form a flexible printed circuit board. The etching method is not particularly limited, and a known etching method can be used.

~Polymer Film~

The laminate according to the embodiment of the present disclosure includes a polymer film in which a linear expansion coefficient of at least one surface X is smaller than a linear expansion coefficient of an inside.

From the viewpoint of linear expansion coefficient of the polymer film and resistance to warping, a linear expansion coefficient of the above-described surface X is preferably −20 ppm/K to 50 ppm/K, more preferably −10 ppm/K to 40 ppm/K, still more preferably 0 ppm/K to 35 ppm/K, particularly preferably 10 ppm/K to 30 ppm/K, and most preferably 15 ppm/K to 25 ppm/K.

From the viewpoint of linear expansion coefficient of the polymer film and resistance to warping, a linear expansion coefficient of the inside of the polymer film (preferably, a central portion of the polymer film in a thickness direction) is preferably 10 ppm/K to 200 ppm/K, more preferably 20 ppm/K to 150 ppm/K, still more preferably 30 ppm/K to 100 ppm/K, and particularly preferably 40 ppm/K to 80 ppm/K.

In the present disclosure, in a case where the polymer film has a single layer structure, the linear expansion coefficient of the inside of the above-described polymer film is a linear expansion coefficient of a central portion of the polymer film in the thickness direction, and in a case of having a multi-layer structure, the linear expansion coefficient of the inside of the above-described polymer film is a linear expansion coefficient of a layer in the central portion of the polymer film in the thickness direction, other than the layer having the surface X or a layer close to the central portion.

From the viewpoint of linear expansion coefficient of the polymer film and resistance to warping, it is preferable that the linear expansion coefficient of the above-described surface Y is equal to or smaller than the linear expansion coefficient of the above-described surface X, it is more preferable to be smaller than the linear expansion coefficient of the above-described surface X.

From the viewpoint of linear expansion coefficient of the polymer film and resistance to warping, a linear expansion coefficient of the above-described surface Y is preferably 10 ppm/K to 200 ppm/K, more preferably 20 ppm/K to 150 ppm/K, still more preferably 30 ppm/K to 100 ppm/K, and particularly preferably 40 ppm/K to 80 ppm/K.

From the viewpoint of linear expansion coefficient of the polymer film and resistance to warping, a value of the linear expansion coefficient of the above-described surface Y—the linear expansion coefficient of the above-described surface X is preferably 10 ppm/K or more, more preferably 20 ppm/K or more, still more preferably 20 ppm/K to 200 ppm/K, and particularly preferably 30 ppm/K to 100 ppm/K.

In addition, from the viewpoint of linear expansion coefficient of the polymer film and resistance to warping, a value of the linear expansion coefficient of the above-described surface Y—the linear expansion coefficient of the inside is preferably 10 ppm/K or more, more preferably 20 ppm/K or more, still more preferably 20 ppm/K to 200 ppm/K, and particularly preferably 30 ppm/K to 100 ppm/K.

From the viewpoint of resistance to warping, a linear expansion coefficient of the above-described polymer film is preferably −20 ppm/K to 50 ppm/K, more preferably −10 ppm/K to 40 ppm/K, still more preferably 0 ppm/K to 35 ppm/K, particularly preferably 10 ppm/K to 30 ppm/K, and most preferably 15 ppm/K to 25 ppm/K.

The linear expansion coefficient in the present disclosure is measured by the following method.

A tensile load of 1 g is applied to both ends of a polymer film having a width of 5 mm and a length of 20 mm, and a linear expansion coefficient is calculated from the inclination of TMA curve between 30° C. and 150° C. using a thermomechanical analyzer (TMA) in a case where the temperature is raised from 25° C. to 200° C. at a rate of 5° C./min, lowered to 30° C. at a rate of 20° C./min, and raised again at a rate of 5° C./min. In a case where the polymer film includes a metal layer or a metal wire, the evaluation is performed after removing the polymer film with ferric chloride.

In addition, in a case where each layer or each surface is measured, a measurement sample may be produced by scraping off unnecessary portions with a razor or the like, and molding the layer or surface to be measured into a thickness of, for example, 5 μm to 10 μm.

In addition, in a case where it is difficult to measure the linear expansion coefficient by the above-described method, the measurement is carried out by the following method.

The film is cut with a microtome to produce a section sample, and the section sample is set in an optical microscope equipped with a heating stage system (HS82, manufactured by METTLER TOLEDO). Subsequently, the section sample was heated from 25° C. to 200° C. at a rate of 5° C./min, cooled to 30° C. at a rate of 20° C./min, and then heated again at a rate of 5° C./min, and a thickness of the polymer film or each layer at 30° C. (ts30) and a thickness of the polymer film or each layer at 150° C. (ts150) are evaluated. Thereafter, a value obtained by dividing the dimensional change by the temperature change ((ts150−ts30)/(150−30)) is calculated to obtain the linear expansion coefficient of the polymer film or each layer.

<Polymer Having Dielectric Loss Tangent of 0.01 or Less>

From the viewpoint of linear expansion coefficient of the polymer film, breaking strength of the polymer film, and resistance to warping, the above-described polymer film preferably contains a polymer having a dielectric loss tangent of 0.01 or less.

From the viewpoint of dielectric loss tangent of the polymer film and adhesiveness with the metal layer or the metal wire, the dielectric loss tangent of the polymer having a dielectric loss tangent of 0.01 or less is preferably 0.005 or less, more preferably 0.004 or less, and particularly preferably more than 0 and 0.003 or less.

The dielectric loss tangent in the present disclosure is measured by the following method.

A dielectric constant is measured by a resonance perturbation method at a frequency of 10 GHz. A 1 GHz cavity resonator (Kanto Electronics Application & Development Inc.) is connected to a network analyzer ("E8362B" manufactured by Agilent Technology), and a sample (width: 2.7 mm×length: 45 mm) of the polymer having a dielectric loss tangent of 0.01 or less is inserted into the cavity resonator, and the dielectric constant and dielectric loss tangent of the polymer having a dielectric loss tangent of 0.01 or less are measured based on a change in resonance frequency for 96 hours before and after the insertion in an environment of a temperature of 20° C. and a humidity of 65% RH.

In a case where a dielectric loss tangent of each layer of the polymer film, which will be described later, is measured, an unnecessary layer may be scraped off with a razor or the like to prepare an evaluation sample of only the target layer. In addition, in a case where it is difficult to take out the single film because the thickness of the layer is thin, a layer to be measured may be scraped off with a razor or the like, and the obtained powdery sample may be used. In the present disclosure, the measurement of the dielectric loss tangent of the polymer is carried out according to the above-described method of measuring a dielectric loss tangent by identifying or isolating a chemical structure of the polymer constituting each layer and using a powdered sample of the polymer to be measured.

A weight-average molecular weight Mw of the polymer having a dielectric loss tangent of 0.01 or less is preferably 1,000 or more, more preferably 2,000 or more, and particularly preferably 5,000 or more. In addition, the weight-average molecular weight Mw of the polymer having a dielectric loss tangent of 0.005 or less is preferably 1,000,000 or less, more preferably 300,000 or less, and particularly preferably less than 100,000.

From the viewpoint of dielectric loss tangent of the polymer film, adhesiveness with the metal layer or the metal wire, and heat resistance, a melting point Tm or a 5%-by-mass-loss temperature Td of the polymer having a dielectric loss tangent of 0.01 or less is preferably 200° C. or higher, more preferably 250° C. or higher, still more preferably 280° C. or higher, and particularly preferably 300° C. or higher and 420° C. or lower.

The melting point Tm in the present disclosure is defined as a value measured by a differential scanning calorimetry (DSC) device. That is, 5 mg of a sample is put into a measurement pan of the DSC, and a peak temperature of an endothermic peak which appears in a case where the sample is heated from 30° C. at 10° C./min in a nitrogen stream is defined as the Tm of the film.

In addition, the 5%-by-mass-loss temperature Td in the present disclosure is measured with a thermogravimetric analysis (TGA) device. That is, a weight of the sample put into the measurement pan is defined as an initial value, and a temperature at which the weight is reduced by 5% by mass with respect to the initial value due to the heating is defined as the 5%-by-mass-loss temperature Td.

From the viewpoint of dielectric loss tangent of the polymer film, adhesiveness with the metal layer or the metal wire, and heat resistance, a glass transition temperature Tg of the polymer having a dielectric loss tangent of 0.01 or less is preferably 150° C. or higher, more preferably 200° C. or higher, and particularly preferably 200° C. or higher and lower than 280° C.

The glass transition temperature Tg in the present disclosure is defined as a value measured by a differential scanning calorimetry (DSC) device.

In the present disclosure, the type of the polymer having a dielectric loss tangent of 0.01 or less is not particularly limited, and a known polymer can be used.

Examples of the polymer having a dielectric loss tangent of 0.01 or less include thermoplastic resins such as a liquid crystal polymer, a fluorine-based polymer, a polymerized substance of a compound which has a cyclic aliphatic hydrocarbon group and a group having an ethylenically unsaturated bond, aromatic polyether ketone, polyolefin, polyamide, polyester, polyphenylene sulfide, polyether ketone, polycarbonate, polyethersulfone, polyphenylene ether and a modified product thereof, and polyetherimide; elastomers such as a copolymer of glycidyl methacrylate and polyethylene; and thermosetting resins such as a phenol resin, an epoxy resin, a polyimide resin, and a cyanate resin.

Among these, from the viewpoint of dielectric loss tangent of the polymer film, adhesiveness with the metal layer or the metal wire, and heat resistance, at least one polymer selected from the group consisting of a liquid crystal polymer, a fluorine-based polymer, a polymerized substance of a compound which has a cyclic aliphatic hydrocarbon group and a group having an ethylenically unsaturated bond, and aromatic polyether ketone is preferable, and at least one polymer selected from the group consisting of a liquid crystal polymer and a fluorine-based polymer is more preferable, and a liquid crystal polymer is particularly preferable from the viewpoint of dielectric loss tangent of the polymer film; and from the viewpoint of heat resistance and mechanical strength, a fluorine-based polymer is preferable.

—Liquid Crystal Polymer—

From the viewpoint of dielectric loss tangent of the polymer film, the polymer having a dielectric loss tangent of 0.01 or less is preferably a liquid crystal polymer.

In the present disclosure, the type of the liquid crystal polymer used as the polymer having a dielectric loss tangent of 0.01 or less is not particularly limited as long as the dielectric loss tangent thereof is 0.01 or less, and a known liquid crystal polymer can be used.

In addition, the liquid crystal polymer may be a thermotropic liquid crystal polymer which exhibits liquid crystallinity in a molten state, or may be a lyotropic liquid crystal polymer which exhibits liquid crystallinity in a solution state. In addition, in a case of the thermotropic liquid crystal, it is preferable that the liquid crystal is melted at a temperature of 450° C. or lower.

Examples of the liquid crystal polymer include a liquid crystal polyester, a liquid crystal polyester amide in which an amide bond is introduced into the liquid crystal polyester, a liquid crystal polyester ether in which an ether bond is introduced into the liquid crystal polyester, and a liquid crystal polyester carbonate in which a carbonate bond is introduced into the liquid crystal polyester.

In addition, as the liquid crystal polymer, from the viewpoint of liquid crystallinity and linear expansion coefficient, a polymer having an aromatic ring is preferable, and an aromatic polyester or an aromatic polyester amide is more preferable.

Further, the liquid crystal polymer may be a polymer in which an imide bond, a carbodiimide bond, a bond derived from an isocyanate, such as an isocyanurate bond, or the like is further introduced into the aromatic polyester or the aromatic polyester amide.

Further, it is preferable that the liquid crystal polymer is a wholly aromatic liquid crystal polymer formed of only an aromatic compound as a raw material monomer.

Examples of the liquid crystal polymer include the following liquid crystal polymers.
1) a liquid crystal polymer obtained by polycondensing (i) an aromatic hydroxycarboxylic acid, (ii) an aromatic dicarboxylic acid, and (iii) at least one compound selected from the group consisting of an aromatic diol, an aromatic hydroxyamine, and an aromatic diamine;
2) a liquid crystal polymer obtained by polycondensing a plurality of types of aromatic hydroxycarboxylic acids;
3) a liquid crystal polymer obtained by polycondensing (i) an aromatic dicarboxylic acid and (ii) at least one compound selected from the group consisting of an aromatic diol, an aromatic hydroxyamine, and an aromatic diamine;
4) a liquid crystal polymer obtained by polycondensing (i) polyester such as polyethylene terephthalate and (ii) an aromatic hydroxycarboxylic acid.

Here, the aromatic hydroxycarboxylic acid, the aromatic dicarboxylic acid, the aromatic diol, the aromatic hydroxyamine, and the aromatic diamine may be each independently replaced with a polycondensable derivative.

For example, the aromatic hydroxycarboxylic acid and the aromatic dicarboxylic acid can be replaced with aromatic hydroxycarboxylic acid ester and aromatic dicarboxylic acid ester, by converting a carboxy group into an alkoxycarbonyl group or an aryloxycarbonyl group.

The aromatic hydroxycarboxylic acid and the aromatic dicarboxylic acid can be replaced with aromatic hydroxycarboxylic acid halide and aromatic dicarboxylic acid halide, by converting a carboxy group into a haloformyl group.

The aromatic hydroxycarboxylic acid and the aromatic dicarboxylic acid can be replaced with aromatic hydroxycarboxylic acid anhydride and aromatic dicarboxylic acid anhydride, by converting a carboxy group into an acyloxycarbonyl group.

Examples of a polymerizable derivative of a compound having a hydroxy group, such as an aromatic hydroxycarboxylic acid, an aromatic diol, and an aromatic hydroxyamine, include a derivative (acylated product) obtained by acylating a hydroxy group and converting the acylated group into an acyloxy group.

For example, the aromatic hydroxycarboxylic acid, the aromatic diol, and the aromatic hydroxyamine can be each replaced with an acylated product by acylating a hydroxy group and converting the acylated group into an acyloxy group.

Examples of a polymerizable derivative of a compound having an amino group, such as an aromatic hydroxyamine or an aromatic diamine, include a derivative (acylated product) obtained by acylating an amino group and converting the acylated group to an acylamino group.

For example, the aromatic hydroxyamine and the aromatic diamine can be each replaced with an acylated product by acylating an amino group and converting the acylated group into an acylamino group.

From the viewpoint of liquid crystallinity, dielectric loss tangent of the polymer film, and adhesiveness with the metal layer, the liquid crystal polymer preferably has a structural unit represented by any of Formulae (1) to (3) (hereinafter, a structural unit represented by Formula (1) or the like may be referred to as a structural unit (1) or the like), more preferably has a structural unit represented by Formula (1), and particularly preferably has a structural unit represented by Formula (1), a structural unit represented by Formula (2), and a structural unit represented by Formula (3).

—O—Ar¹—CO—      Formula (1)

—CO—Ar²—CO—      Formula (2)

—X—Ar³—Y—      Formula (3)

In Formulae (1) to (3), Ar¹ represents a phenylene group, a naphthylene group, or a biphenylylene group, Ar² and Ar³ each independently represent a phenylene group, a naphthylene group, a biphenylylene group, or a group represented by Formula (4), X and Y each independently represent an oxygen atom or an imino group, and hydrogen atoms in Ar¹ to Ar³ may be each independently substituted with a halogen atom, an alkyl group, or an aryl group.

—Ar⁴—Z—Ar⁵—      Formula (4)

In Formula (4), Ar⁴ and Ar⁵ each independently represent a phenylene group or a naphthylene group, and Z represents an oxygen atom, a sulfur atom, a carbonyl group, a sulfonyl group, or an alkylene group.

Examples of the halogen atom include a fluorine atom, a chlorine atom, a bromine atom, and an iodine atom.

Examples of the alkyl group include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, and an n-decyl group. The number of carbon atoms in the alkyl group is preferably 1 to 10.

Examples of the aryl group include a phenyl group, an o-tolyl group, an m-tolyl group, a p-tolyl group, a 1-naphthyl group, and a 2-naphthyl group. The number of carbon atoms in the aryl group is preferably 6 to 20.

In a case where the hydrogen atom is substituted with any of these groups, the number of each of substitutions in Ar¹, Ar², and Ar³ independently is preferably 2 or less and more preferably 1.

Examples of the alkylene group include a methylene group, a 1,1-ethanediyl group, a 1-methyl-1,1-ethanediyl group, a 1,1-butanediyl group, and a 2-ethyl-1,1-hexanediyl group. The number of carbon atoms in the alkylene group is preferably 1 to 10.

The structural unit (1) is a structural unit derived from an aromatic hydroxycarboxylic acid.

Preferred examples of the structural unit (1) include an aspect in which Ar¹ represents a p-phenylene group (structural unit derived from p-hydroxybenzoic acid), an aspect in which Ar³ represents a 2,6-naphthylene group (structural unit derived from 6-hydroxy-2-naphthoic acid), and an aspect in which Ar¹ represents a 4,4'-biphenylylene group (structural unit derived from 4'-hydroxy-4-biphenylcarboxylic acid).

The structural unit (2) is a structural unit derived from an aromatic dicarboxylic acid.

Preferred examples of the structural unit (2) include an aspect in which Ar² represents a p-phenylene group (structural unit derived from terephthalic acid), an aspect in which Ar² represents an m-phenylene group (structural unit derived from isophthalic acid), an aspect in which Ar² represents a 2,6-naphthylene group (structural unit derived from 2,6-naphthalenedicarboxylic acid), and an aspect in which Ar² represents a diphenylether-4,4'-diyl group (structural unit derived from diphenylether-4,4'-dicarboxylic acid).

The structural unit (3) is a structural unit derived from an aromatic diol, an aromatic hydroxylamine, or an aromatic diamine.

Preferred examples of the structural unit (3) include an aspect in which Ar³ represents a p-phenylene group (structural unit derived from hydroquinone, p-aminophenol, or p-phenylenediamine), an aspect in which Ar³ represents an m-phenylene group (structural unit derived from isophthalic acid), and an aspect in which Ar³ represents a 4,4'-biphenylylene group (structural unit derived from 4,4'-dihydroxybiphenyl, 4-amino-4'-hydroxybiphenyl, or 4,4'-diaminobiphenyl).

A content of the structural unit (1) is preferably 30% by mole or more, more preferably 30% to 80% by mole, still more preferably 30% to 60% by mole, and particularly preferably 30% to 40% by mole with respect to the total amount of all structural units (a value obtained by dividing the mass of each structural unit (also referred to as "monomer unit") constituting the liquid crystal polymer by the formula weight of each structural unit to calculate an amount (mole) equivalent to the substance amount of each structural unit and adding up the amounts).

The content of the structural unit (2) is preferably 35% by mole or less, more preferably 10% by mole to 35% by mole, still more preferably 20% by mole to 35% by mole, and particularly preferably 30% by mole to 35% by mole with respect to the total amount of all structural units.

The content of the structural unit (3) is preferably 35% by mole or less, more preferably 10% by mole to 35% by mole, still more preferably 20% by mole to 35% by mole, and particularly preferably 30% by mole to 35% by mole with respect to the total amount of all structural units.

The heat resistance, the strength, and the rigidity are likely to be improved as the content of the structural unit (1) increases, but the solubility in a solvent is likely to be decreased in a case where the content thereof is extremely large.

A proportion of the content of the structural unit (2) to the content of the structural unit (3) is expressed as [content of structural unit (2)]/[content of structural unit (3)] (mol/mol), and is preferably 0.9/1 to 1/0.9, more preferably 0.95/1 to 1/0.95, and still more preferably 0.98/1 to 1/0.98.

The liquid crystal polymer may have two or more kinds of each of the structural units (1) to (3) independently. In addition, the liquid crystal polymer may have a structural unit other than the structural units (1) to (3), but the content thereof is preferably 10% by mole or less and more preferably 5% by mole or less with respect to the total amount of all the structural units.

From the viewpoint of solubility in a solvent, the liquid crystal polymer preferably has, as the structural unit (3), a structural unit (3) in which at least one of X or Y is an imino group, that is, preferably has as the structural unit (3), at least one of a structural unit derived from an aromatic hydroxylamine or a structural unit derived from an aromatic diamine, and it is more preferable to have only a structural unit (3) in which at least one of X or Y is an imino group.

It is preferable that the liquid crystal polymer is produced by melt-polymerizing raw material monomers corresponding to the structural units constituting the liquid crystal polymer. The melt polymerization may be carried out in the presence of a catalyst. Examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as 4-(dimethylamino)pyridine and 1-methylimidazole; and preferred examples thereof include nitrogen-containing heterocyclic compounds. The melt polymerization may be further carried out by solid phase polymerization as necessary.

The lower limit value of a flow start temperature of the liquid crystal polymer is preferably 180° C., more preferably 200° C., and still more preferably 250° C., and the upper limit value of the flow start temperature thereof is preferably 350° C., more preferably 330° C., and still more preferably 300° C. In a case where the flow start temperature of the liquid crystal polymer is within the above-described range, the solubility, the heat resistance, the strength, and the rigidity are excellent, and the viscosity of the solution is appropriate.

The flow start temperature, also referred to as a flow temperature, is a temperature at which a viscosity of 4,800 Pa·s (48,000 poises) is exhibited in a case where the liquid crystal polymer is melted and extruded from a nozzle having an inner diameter of 1 mm and a length of 10 mm while the temperature is raised at a rate of 4° C./min under a load of 9.8 MPa (100 kg/cm$^2$) using a capillary rheometer and is a guideline for the molecular weight of the liquid crystal polymer (see p. 95 of "Liquid Crystal Polymers-Synthesis/Molding/Applications-", written by Naoyuki Koide, CMC Corporation, Jun. 5, 1987).

In addition, a weight-average molecular weight of the liquid crystal polymer is preferably 1,000,000 or less, more preferably 3,000 to 300,000, still more preferably 5,000 to 100,000, and particularly preferably 5,000 to 30,000. In a case where the weight-average molecular weight of the liquid crystal polymer is within the above-described range, a film after heat treatment is excellent in thermal conductivity, heat resistance, strength, and rigidity in the thickness direction.

—Fluorine-Based Polymer—

From the viewpoint of heat resistance and mechanical strength, the polymer having a dielectric loss tangent of 0.01 or less is preferably a fluorine-based polymer.

In the present disclosure, the type of the fluorine-based polymer used as the polymer having a dielectric loss tangent of 0.01 or less is not particularly limited as long as the dielectric loss tangent thereof is 0.01 or less, and a known fluorine-based polymer can be used.

Examples of the fluorine-based polymer include polytetrafluoroethylene, polychlorotrifluoroethylene, polyvinylidene fluoride, polyvinyl fluoride, a perfluoroalkoxy fluororesin, an ethylene tetrafluoride/propylene hexafluoride copolymer, an ethylene/ethylene tetrafluoride copolymer, and an ethylene/chlorotrifluoroethylene copolymer.

Among these, polytetrafluoroethylene is preferable.

In addition, examples of the fluorine-based polymer include a fluorinated α-olefin monomer, that is, an α-olefin monomer containing at least one fluorine atom; and a homopolymer and a copolymer optionally containing a structural unit derived from a non-fluorinated ethylenically unsaturated monomer reactive to the fluorinated α-olefin monomer.

Examples of the fluorinated α-olefin monomer include $CF_2=CF_2$, $CHF=CF_2$, $CH_2=CF_2$, $CHCl=CHF$, $CClF=CF_2$, $CCl_2=CF_2$, $CClF=CClF$, $CHF=CCl_2$, $CH_2=CClF$, $CCl_2=CClF$, $CF_3CF=CF_2$, $CF_3CF=CHF$, $CF_3CH=CF_2$, $CF_3CH=CH_2$, $CHF_2CH=CHF$, $CF_3CF=CF_2$, and perfluoro(alkyl having 2 to 8 carbon atoms) vinyl ether (for example, perfluoromethyl vinyl ether, perfluoropropyl vinyl ether, and perfluorooctyl vinyl ether). Among these, at least one monomer selected from the group consisting of tetrafluoroethylene ($CF_2=CF_2$), chlorotrifluoroethylene ($CClF=CF_2$), (perfluorobutyl)ethylene, vinylidene fluoride ($CH_2=CF_2$), and hexafluoropropylene ($CF_2=CFCF_3$) is preferable.

Examples of the non-fluorinated monoethylenically unsaturated monomer include ethylene, propylene, butene, and an ethylenically unsaturated aromatic monomer (for example, styrene and α-methyl styrene).

The fluorinated α-olefin monomer may be used alone or in combination of two or more thereof.

In addition, the non-fluorinated ethylenically unsaturated monomer may be used alone or in combination of two or more thereof.

Examples of the fluorine-based polymer include poly-chlorotrifluoroethylene (PCTFE), poly(chlorotrifluoroethylene-propylene), poly(ethylene-tetrafluoroethylene) (ETFE), poly(ethylene-chlorotrifluoroethylene) (ECTFE), poly(hexafluoropropylene), poly(tetrafluoroethylene) (PTFE), poly(tetrafluoroethylene-ethylene-propylene), poly(tetrafluoroethylene-hexafluoropropylene) (FEP), poly(tetrafluoroethylene-propylene) (FEPM), poly(tetrafluoroethylene-perfluoropropylene vinyl ether), poly(tetrafluoroethylene-perfluoroalkyl vinyl ether) (PFA) (for example, poly(tetrafluoroethylene-perfluoropropyl vinyl ether)), polyvinyl fluoride (PVF), polyvinylidene fluoride (PVDF), poly(vinylidene fluoride-chlorotrifluoroethylene), perfluoropolyether, perfluorosulfonic acid, and perfluoropolyoxetane.

The fluorine-based polymer may be used alone or in combination of two or more thereof.

The fluorine-based polymer is preferably at least one of FEP, PFA, ETFE, or PTFE. The FEP is available from Du Pont as the trade name of TEFLON (registered trademark) FEP or from DAIKIN INDUSTRIES, LTD. as the trade name of NEOFLON FEP; and the PFA is available from DAIKIN INDUSTRIES, LTD. as the trade name of NEOFLON PFA, from Du Pont as the trade name of TEFLON (registered trademark) PFA, or from Solvay Solexis as the trade name of HYFLON PFA.

The fluorine-based polymer preferably includes PTFE. The PTFE can be included as a PTFE homopolymer, a partially modified PTFE homopolymer, or a combination including one or both of these. The partially modified PTFE homopolymer preferably contains a structural unit derived from a comonomer other than tetrafluoroethylene in an amount of less than 1% by mass based on the total mass of the polymer.

The fluorine-based polymer may be a crosslinkable fluoropolymer having a crosslinkable group. The crosslinkable fluoropolymer can be crosslinked by a known crosslinking method in the related art. One of the representative crosslinkable fluoropolymers is a fluoropolymer having a (meth) acryloxy group. For example, the crosslinkable fluoropolymer can be represented by Formula:

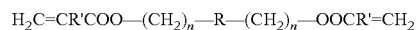

in the formula, R is a fluorine-based oligomer chain having two or more structural units derived from the fluorinated α-olefin monomer or the non-fluorinated monoethylenically unsaturated monomer, R' is H or —CH$_3$, and n is 1 to 4. R may be a fluorine-based oligomer chain having a structural unit derived from tetrafluoroethylene.

In order to initiate a radical crosslinking reaction through the (meth)acryloxy group in the fluorine-based polymer, by exposing the fluoropolymer having a (meth)acryloxy group to a free radical source, a crosslinked fluoropolymer network can be formed. The free radical source is not particularly limited, and suitable examples thereof include a photoradical polymerization initiator and an organic peroxide. Appropriate photoradical polymerization initiators and organic peroxides are well known in the art. The crosslinkable fluoropolymer is commercially available, and examples thereof include Viton B manufactured by Du Pont.

—Polymerized Substance of Compound which has Cyclic Aliphatic Hydrocarbon Group and Group Having Ethylenically Unsaturated Bond—

The polymer having a dielectric loss tangent of 0.01 or less may be a polymerized substance of a compound which has a cyclic aliphatic hydrocarbon group and a group having an ethylenically unsaturated bond.

Examples of the polymerized substance of a compound which has a cyclic aliphatic hydrocarbon group and a group having an ethylenically unsaturated bond include thermoplastic resins having a structural unit formed from a monomer having a cyclic olefin such as norbornene and a polycyclic norbornene-based monomer, which is also referred to as a thermoplastic cyclic olefin-based resin.

The polymerized substance of a compound which has a cyclic aliphatic hydrocarbon group and a group having an ethylenically unsaturated bond may be a ring-opened polymer of the above-described cyclic olefin, a hydrogenated product of a ring-opened copolymer using two or more cyclic olefins, or an addition polymer of a cyclic olefin and a linear olefin or aromatic compound having an ethylenically unsaturated bond such as a vinyl group. In addition, a polar group may be introduced into the polymerized substance of a compound which has a cyclic aliphatic hydrocarbon group and a group having an ethylenically unsaturated bond.

The polymerized substance of a compound which has a cyclic aliphatic hydrocarbon group and a group having an ethylenically unsaturated bond may be used alone or in combination of two or more thereof.

A ring structure of the cyclic aliphatic hydrocarbon group may be a single ring, a fused ring in which two or more rings are fused, or a crosslinked ring.

Examples of the ring structure of the cyclic aliphatic hydrocarbon group include a cyclopentane ring, a cyclohexane ring, a cyclooctane ring, an isophorone ring, a norbornane ring, and a dicyclopentane ring.

The compound which has a cyclic aliphatic hydrocarbon group and a group having an ethylenically unsaturated bond may be a monofunctional ethylenically unsaturated compound or a polyfunctional ethylenically unsaturated compound.

The number of cyclic aliphatic hydrocarbon groups in the compound which has a cyclic aliphatic hydrocarbon group and a group having an ethylenically unsaturated bond may be 1 or more, and may be 2 or more.

It is sufficient that the polymerized substance of a compound which has a cyclic aliphatic hydrocarbon group and a group having an ethylenically unsaturated bond is a polymer obtained by polymerizing at least one compound which has a cyclic aliphatic hydrocarbon group and a group having an ethylenically unsaturated bond, and it may be a polymerized substance of two or more kinds of the compound which has a cyclic aliphatic hydrocarbon group and a group having an ethylenically unsaturated bond or a copolymer with other ethylenically unsaturated compounds having no cyclic aliphatic hydrocarbon group.

In addition, the polymerized substance of a compound which has a cyclic aliphatic hydrocarbon group and a group having an ethylenically unsaturated bond is preferably a cycloolefin polymer.

—Polyphenylene Ether—

The polymer having a dielectric loss tangent of 0.01 or less may be a polyphenylene ether.

In a case where heat curing is performed after film formation, from the viewpoint of heat resistance and film-forming property, a weight-average molecular weight (Mw) of the polyphenylene ether is preferably 500 to 5,000 and preferably 500 to 3,000. In addition, in a case where the heat curing is not performed, the weight-average molecular weight (Mw) of the polyphenylene ether is not particularly limited, but is preferably 3,000 to 100,000 and preferably 5,000 to 50,000.

In the polyphenylene ether, from the viewpoint of dielectric loss tangent and heat resistance, the average number of molecular terminal phenolic hydroxyl groups per molecule (the number of terminal hydroxyl groups) is preferably 1 to 5 and more preferably 1.5 to 3.

The number of hydroxyl groups or the number of phenolic hydroxyl groups in the polyphenylene ether can be found, for example, from a standard value of a product of the polyphenylene ether. In addition, examples of the number of terminal hydroxyl groups or the number of terminal phenolic hydroxyl groups include a numerical value representing an average value of hydroxyl groups or phenolic hydroxyl groups per molecule of all polyphenylene ethers present in 1 mol of the polyphenylene ether.

The polyphenylene ether may be used alone or in combination of two or more thereof.

Examples of the polyphenylene ether include a polyphenylene ether including 2,6-dimethylphenol and at least one of bifunctional phenol or trifunctional phenol, and a compound mainly including the polyphenylene ether, such as poly(2,6-dimethyl-1,4-phenylene oxide). More specifically, for example, a compound having a structure represented by Formula (PPE) is preferable.

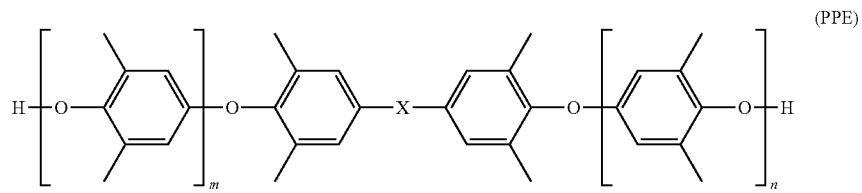

(PPE)

In Formula (PPE), X represents an alkylene group having 1 to 3 carbon atoms or a single bond, m represents an integer of 0 to 20, n represents an integer of 0 to 20, and the sum of m and n represents an integer of 1 to 30.

Examples of the alkylene group in X described above include a dimethylmethylene group.

—Aromatic Polyether Ketone—

The polymer having a dielectric loss tangent of 0.01 or less may be an aromatic polyether ketone.

The aromatic polyether ketone is not particularly limited, and a known aromatic polyether ketone can be used.

The aromatic polyether ketone is preferably a polyether ether ketone.

The polyether ether ketone is one type of the aromatic polyether ketone, and is a polymer in which bonds are arranged in the order of an ether bond, an ether bond, and a carbonyl bond (ketone). It is preferable that the bonds are linked to each other by a divalent aromatic group.

The aromatic polyether ketone may be used alone or in combination of two or more thereof.

Examples of the aromatic polyether ketone include polyether ether ketone (PEEK) having a chemical structure represented by Formula (P1), polyether ketone (PEK) having a chemical structure represented by Formula (P2), polyether ketone ketone (PEKK) having a chemical structure represented by Formula (P3), polyether ether ketone ketone (PEEKK) having a chemical structure represented by Formula (P4), and polyether ketone ether ketone ketone (PEKEKK) having a chemical structure represented by Formula (P5).

by mass to 100% by mass, and particularly preferably 50% by mass to 100% by mass with respect to the total mass of the polymer film.

<Filler>

From the viewpoint of linear expansion coefficient and resistance to warping, the polymer film preferably contains a filler.

The filler may be particulate or fibrous, and may be an inorganic filler or an organic filler.

In the above-described polymer film, from the viewpoint of linear expansion coefficient and adhesiveness with the metal layer or the metal wire, it is preferable that a number density of the above-described filler is higher inside the above-described polymer film than on the surface of the above-described polymer film.

As the inorganic filler, a known inorganic filler can be used.

Examples of a material of the inorganic filler include BN, $Al_2O_3$, AlN, $TiO_2$, $SiO_2$, barium titanate, strontium titanate,

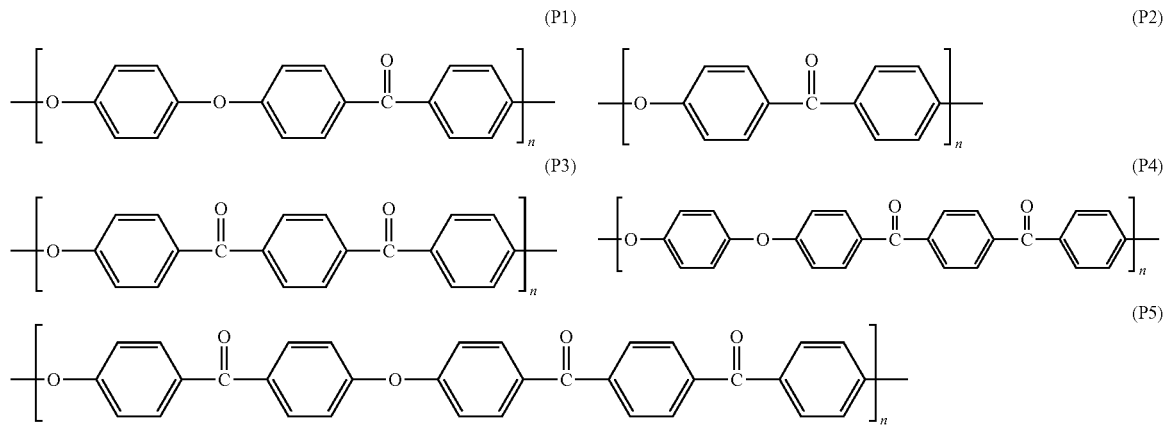

From the viewpoint of mechanical properties, each n of Formulae (P1) to (P5) is preferably 10 or more and more preferably 20 or more. On the other hand, from the viewpoint that the aromatic polyether ketone can be easily produced, n is preferably 5,000 or less and more preferably 1,000 or less. That is, n is preferably 10 to 5,000 and more preferably 20 to 1,000.

The polymer having a dielectric loss tangent of 0.01 or less is preferably a polymer soluble in a specific organic solvent (hereinafter, also referred to as "soluble polymer").

Specifically, the soluble polymer in the present disclosure is a polymer in which 0.1 g or more thereof is dissolved at 25° C. in 100 g of at least one solvent selected from the group consisting of N-methylpyrrolidone, N-ethylpyrrolidone, dichloromethane, dichloroethane, chloroform, N,N-dimethylacetamide, γ-butyrolactone, dimethylformamide, ethylene glycol monobutyl ether, and ethylene glycol monoethyl ether.

The polymer film may contain only one kind of the polymer having a dielectric loss tangent of 0.01 or less, or may contain two or more kinds thereof.

From the viewpoint of dielectric loss tangent of the polymer film, breaking strength of the polymer film, and resistance to warping, the content of the polymer having a dielectric loss tangent of 0.01 or less in the polymer film is preferably 20% by mass to 100% by mass, more preferably 30% by mass to 100% by mass, still more preferably 40% aluminum hydroxide, calcium carbonate, and a material containing two or more of these.

Among these, as the inorganic filler, from the viewpoint of adhesiveness with the metal layer or the metal wire, metal oxide particles or fibers are preferable, silica particles, titania particles, or glass fibers are more preferable, and silica particles or glass fibers are particularly preferable.

An average particle diameter of the inorganic filler is preferably approximately 20% to approximately 40% of the thickness of a containing layer, and for example, the average particle diameter may be selected from 25%, 30%, or 35% of the thickness of a containing layer. In a case where the particles or fibers are flat, the average particle diameter indicates a length in a short side direction.

In addition, from the viewpoint of adhesiveness with the metal layer or the metal wire, the average particle diameter of the inorganic filler is preferably 5 nm to 20 μm, more preferably 10 nm to 10 μm, still more preferably 20 nm to 1 μm, and particularly preferably 25 nm to 500 nm.

As the organic filler, a known organic filler can be used.

Examples of a material of the organic filler include polyethylene, polystyrene, urea-formalin filler, polyester, cellulose, acrylic resin, fluororesin, cured epoxy resin, crosslinked benzoguanamine resin, crosslinked acrylic resin, and a material containing two or more kinds of these.

In addition, the organic filler may be fibrous, such as nanofibers, or may be hollow resin particles.

Among these, as the organic filler, from the viewpoint of adhesiveness with the metal layer or the metal wire, fluororesin particles, polyester-based resin particles, or cellulose-based resin nanofibers are preferable, and polytetrafluoroethylene particles are more preferable.

From the viewpoint of adhesiveness with the metal layer or the metal wire, the average particle diameter of the organic filler is preferably 5 nm to 20 more preferably 10 nm to 1 still more preferably 20 nm to 500 nm, and particularly preferably 25 nm to 90 nm.

The polymer film may contain only one or two or more kinds of the fillers.

From the viewpoint of adhesiveness with the metal layer or the metal wire, the content of the filler in the polymer film is preferably 5% by volume to 80% by volume, more preferably 10% by volume to 70% by volume, still more preferably 15% by volume to 70% by volume, and particularly preferably 20% by volume to 60% by volume with respect to the total volume of the polymer film.

—Other Additives—

The above-described polymer film may contain an additive other than the above-described components.

Known additives can be used as other additives. Specific examples of the other additives include a leveling agent, an antifoaming agent, an antioxidant, an ultraviolet absorbing agent, a flame retardant, and a colorant.

In addition, the above-described polymer film may contain, as the other additives, a resin other than the polymer having a dielectric loss tangent of 0.01 or less.

Examples of other resins include thermoplastic resins such as polypropylene, polyamide, polyester, polyphenylene sulfide, polyether ketone, polycarbonate, polyethersulfone, polyphenylene ether and a modified product thereof, and polyetherimide; elastomers such as a copolymer of glycidyl methacrylate and polyethylene; and thermosetting resins such as a phenol resin, an epoxy resin, a polyimide resin, and a cyanate resin.

The total content of the other additives in the above-described polymer film is preferably 25 parts by mass or less, more preferably 10 parts by mass or less, and still more preferably 5 parts by mass or less with respect to 100 parts by mass of the content of the polymer having a dielectric loss tangent of 0.005 or less.

In addition, it is preferable that the total content of the other additives in the polymer film is smaller than the content of the compound having a functional group.

In addition, the above-described polymer film may have a multilayer structure.

The above-described polymer film preferably includes a layer A and a layer B on at least one surface of the layer A.

In the polymer film including the layer A and the layer B, the above-described surface X may be a surface on the layer A side or a surface on the layer B side, but is preferably a surface on the layer B side.

From the viewpoint of dielectric loss tangent of the polymer film and adhesiveness with the metal layer or the metal wire, the above-described polymer film preferably includes a layer A containing the polymer having a dielectric loss tangent of 0.01 or less and a layer B containing the polymer having a dielectric loss tangent of 0.01 or less and the filler, which is on at least one surface of the layer A.

The layer A is preferably a layer consisting of the polymer having a dielectric loss tangent of 0.01 or less.

From the viewpoint of resistance to warping, the layer B preferably contains the filler.

From the viewpoint of resistance to warping, it is preferable that a linear expansion coefficient of the layer B is smaller than a linear expansion coefficient of the layer A.

It is preferable that the surface of the layer B opposite to the layer A side is the above-described surface X.

In addition, from the viewpoint of linear expansion coefficient of the polymer film and resistance to warping, a linear expansion coefficient of a surface of the layer B, which is opposite to the layer A side, is preferably −20 ppm/K to 50 ppm/K, more preferably −10 ppm/K to 40 ppm/K, still more preferably 0 ppm/K to 35 ppm/K, particularly preferably 10 ppm/K to 30 ppm/K, and most preferably 15 ppm/K to 25 ppm/K.

It is preferable that the surface of the layer A opposite to the layer B side is the above-described surface Y.

In addition, from the viewpoint of linear expansion coefficient of the polymer film and resistance to warping, a linear expansion coefficient of a surface of the layer A, which is opposite to the layer B side, is preferably 10 ppm/K to 200 ppm/K, more preferably 20 ppm/K to 150 ppm/K, still more preferably 30 ppm/K to 100 ppm/K, and particularly preferably 40 ppm/K to 80 ppm/K.

In addition, it is preferable that the above-described polymer film further includes a layer C in addition to the layer A and the layer B, and the layer B, the layer A, and the layer C are provided in this order.

In the polymer film including the above-described layers A to C, the above-described surface X may be a surface on the layer B side or a surface on the layer C side, but is preferably a surface on the layer B side.

The layer C preferably contains the polymer having a dielectric loss tangent of 0.01 or less.

In addition, it is preferable that the laminate according to the embodiment of the present disclosure includes the polymer film according to the embodiment of the present disclosure in which the layer B, the layer A, and the layer C are provided in this order, a metal layer disposed on a surface of the above-described layer B side of the polymer film, and a metal layer disposed on a surface of the above-described layer C side of the polymer film; and it is more preferable that both of the metal layers are copper layers.

The metal layer disposed on the surface of the above-described layer B side is preferably a metal layer disposed on the surface of the above-described layer B.

It is preferable that the metal layer disposed on the surface of the above-described layer C side is a metal layer disposed on the surface of the above-described layer C, and it is more preferable that the metal layer disposed on the surface of the above-described layer B side is a metal layer disposed on the surface of the above-described layer B, and the metal layer disposed on the surface of the above-described layer C side is a metal layer disposed on the surface of the above-described layer C.

In addition, the metal layer disposed on the surface of the above-described layer B side and the metal layer disposed on the surface of the above-described layer C side may be a metal layer having the same material, thickness, and shape, or may be metal layers having different materials, thicknesses, and shapes. From the viewpoint of adjusting the characteristic impedance, the metal layer disposed on the surface of the above-described layer B side and the metal layer disposed on the surface of the above-described layer C side may be metal layers having different materials or thicknesses, or a metal layer may be laminated on only one side of the layer B or the layer C.

In addition, in a case where the layer B and the layer C are layers which come into contact with the metal layer as a laminate, it is preferable to contain a compound having a functional group, which will be described later, and it is more preferable to contain a compound having a curing reactive group, which will be described later.

The above-described functional group is preferably at least one group selected from the group consisting of a covalent-bondable group, an ion-bondable group, a hydrogen-bondable group, a dipole-interactable group, and a curing reactive group.

The compound having a functional group may be a low-molecular-weight compound or a high-molecular-weight compound.

From the viewpoint of compatibility between the above-described polymer and the compound having a functional group and viewpoint of dielectric loss tangent of the polymer film, the compound having a functional group is preferably a low-molecular-weight compound, and from the viewpoint of heat resistance of the polymer film and mechanical strength, the compound having a functional group is preferably a high-molecular-weight compound.

It is sufficient that the number of functional groups in the compound having a functional group is 1 or more, and it may be 2 or more. However, the number of functional groups in the compound having a functional group is preferably 2 or more, and from the viewpoint of reducing the dielectric loss tangent of the polymer film by setting the amount of functional groups to an appropriate amount, it is preferably 10 or less.

In addition, the compound having a functional group may have only one kind of functional group, or two or more kinds of functional groups.

From the viewpoint of adhesiveness with the metal layer, the low-molecular-weight compound used as the compound having a functional group preferably has a molecular weight of 50 or more and less than 2,000, more preferably has a molecular weight of 100 or more and less than 1,000, and particularly preferably has a molecular weight of 200 or more and less than 1,000.

In a case where the compound having a functional group is a low-molecular-weight compound, the spread of the compound is narrow, and in order to increase the contact probability between the functional groups, a content of the compound having a functional group is preferably 10% by mass or more with respect to the total mass of the layer B.

In addition, from the viewpoint of adhesiveness with the metal layer, the high-molecular-weight compound used as the compound having a functional group is preferably a polymer having a weight-average molecular weight of 1,000 or more, more preferably a polymer having a weight-average molecular weight of 2,000 or more, still more preferably a polymer having a weight-average molecular weight of 3,000 or more and 1,000,000 or less, and particularly preferably a polymer having a weight-average molecular weight of 5,000 or more and 200,000 or less.

Furthermore, from the viewpoint of dielectric loss tangent of the polymer film and adhesiveness with the metal layer, it is preferable that the polymer having a dielectric loss tangent of 0.005 or less and the compound having a functional group are compatible with each other.

From the viewpoint of compatibility between the above-described polymer and the compound having a functional group, dielectric loss tangent of the polymer film, and adhesiveness with the metal layer, a difference between an SP value of the polymer having a dielectric loss tangent of 0.005 or less, which is determined by Hoy method, and an SP value of the compound having a functional group, which is determined by Hoy method, is preferably 5 $MPa^{0.5}$ or less. The lower limit value thereof is 0 $MPa^{0.5}$.

The solubility parameter value (SP value) determined by Hoy method is calculated from the molecular structure of the resin by the method described in Polymer Handbook fourth edition. In addition, in a case where the resin is a mixture of a plurality types of resins, the SP value is obtained by calculating an SP value of each structural unit.

<<Functional Group>>

The functional group in the compound having a functional group is preferably at least one group selected from the group consisting of a covalent-bondable group, an ion-bondable group, a hydrogen-bondable group, a dipole-interactable group, and a curing reactive group.

From the viewpoint of adhesiveness between the layer C and the metal layer, the functional group is preferably a covalent-bondable group or a curing reactive group, and more preferably a covalent-bondable group.

In addition, from the viewpoint of storage stability and handleability, the functional group is preferably an ion-bondable group, a hydrogen-bondable group, or a dipole-interactable group.

—Covalent-Bondable Group—

The covalent-bondable group is not particularly limited as long as the group is capable of forming a covalent bond, and examples thereof include an epoxy group, an oxetanyl group, an isocyanate group, an acid anhydride group, a carbodiimide group, a N-hydroxy ester group, a glyoxal group, an imide ester group, a halogenated alkyl group, a thiol group, a hydroxy group, a carboxy group, an amino group, an amide group, an isocyanate group, an aldehyde group, and a sulfonic acid group. Among these, from the viewpoint of adhesiveness between the layer C and the metal layer, the covalent-bondable group is preferably at least one functional group selected from the group consisting of an epoxy group, an oxetanyl group, an N-hydroxy ester group, an isocyanate group, an imide ester group, a halogenated alkyl group, and a thiol group, and particularly preferably an epoxy group.

In addition, as will be described later, it is preferable that the surface of the metal to be bonded to the layer C has a group which is paired with the functional group in the compound having a functional group.

Examples of a combination of the covalent-bondable group and a group which can be paired with the covalent-bondable group (a combination of the functional group in the compound having a functional group and the group present in the surface of the metal) include an aspect in which, for example, in a case where one is an epoxy group or an oxetanyl group, the other is a hydroxy group or an amino group.

Examples thereof also include an aspect in which, for example, in a case where one in the above-described combination is an N-hydroxy ester group or an imide ester group, the other is an amino group.

—Ion-Bondable Group—

Examples of the ion-bondable group include a cationic group and an anionic group.

The above-described cationic group is preferably an onium group. Examples of the onium group include an ammonium group, a pyridinium group, a phosphonium group, an oxonium group, a sulfonium group, a selenonium group, and an iodonium group. Among these, from the viewpoint of adhesiveness between the layer C and the metal layer, an ammonium group, a pyridinium group, a phosphonium group, or a sulfonium group is preferable, an ammonium group or a phosphonium group is more preferable, and an ammonium group is particularly preferable.

The anionic group is not particularly limited, and examples thereof include a phenolic hydroxyl group, a carboxy group, —SO$_3$H, —OSO$_3$H, —PO$_3$H, —OPO$_3$H$_2$, —CONHSO$_2$—, and —SO$_2$NHSO$_2$—. Among these, a phosphoric acid group, a phosphonic acid group, a phosphinic acid group, a sulfuric acid group, a sulfonic acid group, a sulfinic acid group, or a carboxy group is preferable, a phosphoric acid group or a carboxy group is more preferable, and a carboxy group is still more preferable.

Examples of a combination of the ion-bondable group and a group which can be paired with the ion-bondable group (a combination of the functional group in the compound having a functional group and the group present in the surface of the metal) include an aspect in which, for example, in a case where one is an acidic group, the other is a basic group.

Examples of the above-described acidic group include a carboxy group, a sulfo group, and a phosphoric acid group, and a carboxy group is preferable.

In addition, examples thereof include an aspect in which, for example, in a case where one in the above-described combination is a carboxy group, the ion-bondable group with the carboxy group is a tertiary amino group, a pyridyl group, or a piperidyl group.

—Hydrogen-Bondable Group—

Examples of the hydrogen-bondable group include a group having a hydrogen-bond-donating moiety and a group having a hydrogen-bond-accepting moiety.

It is sufficient that the hydrogen-bond-donating moiety has a structure having an active hydrogen atom capable of hydrogen bonding, and a structure represented by X—H is preferable.

X represents a heteroatom, and is preferably a nitrogen atom or an oxygen atom.

From the viewpoint of adhesiveness between the layer C and the metal layer, as the above-described hydrogen-bond-donating moiety, at least one structure selected from the group consisting of a hydroxy group, a carboxy group, a primary amide group, a secondary amide group, a primary amino group, a secondary amino group, a primary sulfonamide group, a secondary sulfonamide group, an imide group, a urea bond, and a urethane bond is preferable; at least one structure selected from the group consisting of a hydroxy group, a carboxy group, a primary amide group, a secondary amide group, a primary sulfonamide group, a secondary sulfonamide group, a maleimide group, a urea bond, and a urethane bond is more preferable; at least one structure selected from the group consisting of a hydroxy group, a carboxy group, a primary amide group, a secondary amide group, a primary sulfonamide group, a secondary sulfonamide group, and a maleimide group is still more preferable; and at least one structure selected from the group consisting of a hydroxy group and a secondary amide group is particularly preferable.

The above-described hydrogen-bond-accepting moiety may be a structure containing an atom with an unshared electron pair, and a structure containing an oxygen atom with an unshared electron pair is preferable; at least one structure selected from the group consisting of a carbonyl group (including a carbonyl structure such as a carboxy group, an amide group, an imide group, a urea bond, and a urethane bond) and a sulfonyl group (including a sulfonyl structure such as a sulfonamide group) is more preferable; and a carbonyl group (including a carbonyl structure such as a carboxy group, an amide group, an imide group, a urea bond, and a urethane bond) is particularly preferable.

As the hydrogen-bondable group, a group having both the hydrogen-bond-donating moiety and the hydrogen-bond-accepting moiety described above is preferable; it is preferable to have a carboxy group, an amide group, an imide group, a urea bond, a urethane bond, or a sulfonamide group, and it is more preferable to have a carboxy group, an amide group, an imide group, or a sulfonamide group.

Examples of a combination of the hydrogen-bondable group and a group which can be paired with the hydrogen-bondable group (a combination of the functional group in the compound having a functional group and the group present in the surface of the metal) include an aspect in which, in a case where one is a group having a hydrogen-bond-donating moiety, the other is a group having a hydrogen-bond-accepting moiety.

Examples thereof include an aspect in which, in a case where one in the above-described combination is a carboxy group, the other is an amide group or a carboxy group.

Examples thereof also include an aspect in which, in a case where one in the above-described combination is a phenolic hydroxyl group, the other is a phenolic hydroxyl group.

—Dipole-Interactable Group—

It is sufficient that the dipole-interactable group is a group having a polarized structure other than the above-described structure represented by X—H (X represents a heteroatom, for example, a nitrogen atom or an oxygen atom) in the hydrogen-bondable group, and suitable examples thereof include a group in which atoms with different electronegativities are bonded to each other.

As a combination of the atoms with different electronegativities, a combination of at least one atom selected from the group consisting of an oxygen atom, a nitrogen atom, a sulfur atom, and a halogen atom, and a carbon atom is preferable; and a combination of at least one atom selected from the group consisting of an oxygen atom, a nitrogen atom, and a sulfur atom, and a carbon atom is more preferable.

Among these, from the viewpoint of adhesiveness between the layer C and the metal layer, a combination of a nitrogen atom and a carbon atom or a combination of a carbon atom, a nitrogen atom, an oxygen atom, and a sulfur atom is preferable, and specifically, a cyano group, a cyanuric group, or a sulfonic acid amide group is more preferable.

Preferred examples of a combination of the dipole-interactable group and a group which can be paired with the dipole-interactable group (a combination of the functional group in the compound having a functional group and the group present in the surface of the metal) include a combination of identical dipole-interactable groups.

Examples thereof include an aspect in which, in a case where one in the above-described combination is a cyano group, the other is a cyano group.

Examples thereof also include an aspect in which, in a case where one in the above-described combination is a sulfonic acid amide group, the other is a sulfonic acid amide group.

—Curing Reactive Group—

Examples of the curing reactive group include an ethylenically unsaturated group, a cyclic ether group, a cyanato group, a reactive silyl group, an oxazine ring group, and a urethane group.

The following curable compound may be used as the compound having a curing reactive group.

~Curable Compound~

The curable compound is a compound which is cured by irradiation with heat or light (for example, visible light, ultraviolet rays, near-infrared rays, far-infrared rays, electron beam, or the like), may require a curing aid described later. Examples of such a curable compound include an epoxy compound, a cyanate ester compound, a vinyl compound, a silicone compound, an oxazine compound, a maleimide compound, an allyl compound, an acrylic compound, a methacrylic compound, and a urethane compound. These may be used alone or in combination of two or more thereof. Among these, from the viewpoint of characteristics such as compatibility with the above-described polymer and heat resistance, at least one selected from the group consisting of an epoxy compound, a cyanate ester compound, a vinyl compound, a silicone compound, an oxazine compound, a maleimide compound, and an allyl compound is preferable; and at least one selected from the group consisting of an epoxy compound, a cyanate ester compound, a vinyl compound, an allyl compound, and a silicone compound is more preferable.

A content of the curable compound in the layer B is preferably 10% by mass or more and 90% by mass or less, and more preferably 20% by mass or more and 80% by mass or less with respect to the total mass of the layer C.

—Curing Aid—

Examples of the curing aid include polymerization initiators such as a photoreaction initiator (a photoradical generator, a photoacid generator, or a photobase generator). Specific examples of the curing aid include an onium salt compound, a sulfone compound, a sulfonate compound, a sulfonimide compound, a disulfonyldiazomethane compound, a disulfonylmethane compound, an oximesulfonate compound, a hydrazinesulfonate compound, a triazine compound, a nitrobenzyl compound, a benzylimidazole compound, organic halides, octylic acid metal salt, and disulfone. These curing aids may be used alone or in combination of two or more thereof, regardless of the type.

A content of the curing aid in the layer B is preferably 5% by mass or more and 20% by mass or less, and more preferably 5% by mass or more and 10% by mass or less with respect to the total mass of the layer B.

As the functional group in the compound having a functional group, specifically, it is preferable to have an epoxy group, an oxetanyl group, an isocyanate group, an acid anhydride group, a carbodiimide group, an N-hydroxy ester group, a glyoxal group, an imidoester group, a halogenated alkyl group, a thiol group, a hydroxy group, a carboxy group, an amino group, an amide group, an isocyanate group, an aldehyde group, a sulfuric acid group, a sulfonic acid group, an ammonium group, a pyridinium group, a phosphonium group, an oxonium group, a sulfonium group, a selenonium group, an iodonium group, a phosphoric acid group, a phosphonic acid group, a phosphinic acid group, a sulfonic acid group, or at least one selected from the group consisting of a sulfinic acid group or a carboxy group, a hydroxy group, a carboxy group, a primary amide group, a secondary amide group, a primary amino group, a secondary amino group, a primary sulfonamide group, a secondary sulfonamide group, an imide group, a urea bond, and a urethane bond. From the viewpoint of improving the adhesiveness, an epoxy group, an oxetanyl group, an isocyanate group, an acid anhydride group, a carbodiimide group, an N-hydroxy ester group, a glyoxal group, an imidoester group, a halogenated alkyl group, or a thiol group is more preferable.

Specific examples of the bonds or interaction between two kinds of the functional groups are described below, but the bonds or interaction in the present disclosure is not limited thereto.

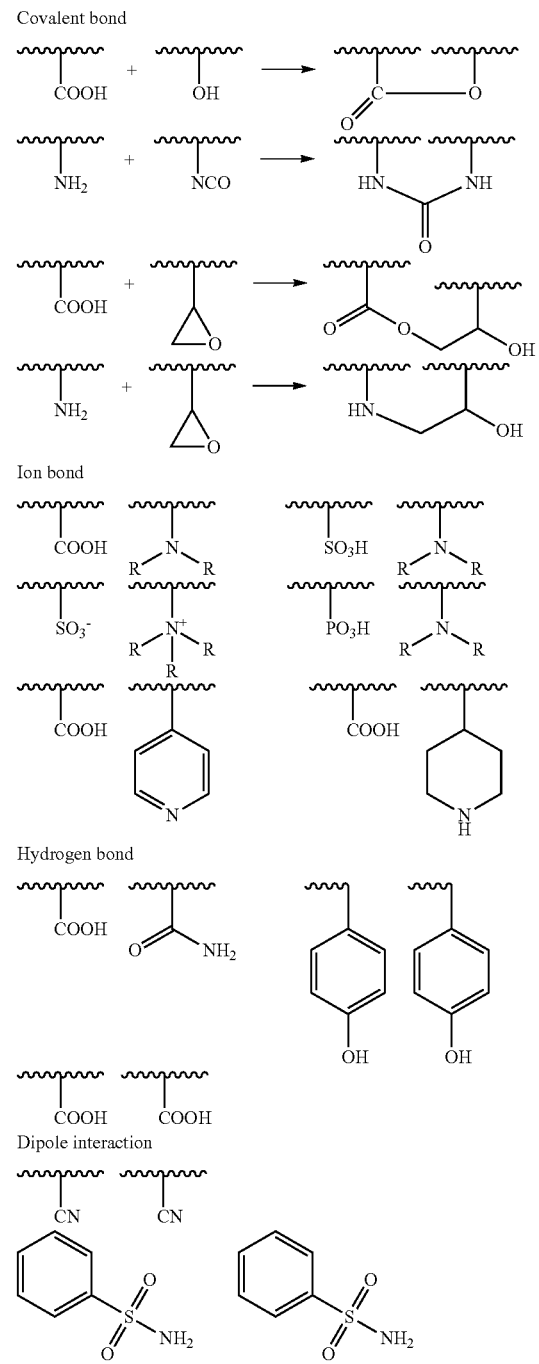

From the viewpoint of dielectric loss tangent of the polymer film and adhesiveness with the metal layer, the compound having a functional group is preferably a polyfunctional epoxy compound or a polymer of a polyfunctional epoxy compound, more preferably a bifunctional epoxy compound or a polymer of a bifunctional epoxy compound, and particularly preferably a bifunctional epoxy compound.

The layer B or layer C may contain only one or two or more kinds of the compounds having a functional group.

From the viewpoint of dielectric loss tangent of the polymer film and adhesiveness with the metal layer, a content of the compound having a functional group in the layer B or layer C is preferably 1% by mass to 80% by mass, more preferably 5% by mass to 70% by mass, still more preferably 10% by mass to 60% by mass, and particularly preferably 20% by mass to 60% by mass with respect to the total mass of the polymer film.

From the viewpoint of resistance to warping, it is preferable that a linear expansion coefficient of the layer B is smaller than a linear expansion coefficient of the layer C.

In the polymer film including the above-described layers A to C, it is preferable that the surface of the layer B opposite to the layer A side is the above-described surface X.

In addition, from the viewpoint of linear expansion coefficient of the polymer film and resistance to warping, a linear expansion coefficient of a surface of the layer B, which is opposite to the layer A side, is preferably −20 ppm/K to 50 ppm/K, more preferably −10 ppm/K to 40 ppm/K, still more preferably 0 ppm/K to 35 ppm/K, particularly preferably 10 ppm/K to 30 ppm/K, and most preferably 15 ppm/K to 25 ppm/K.

In the polymer film including the above-described layers A to C, it is preferable that the surface of the layer C opposite to the layer A side is the above-described surface Y.

Furthermore, from the viewpoint of linear expansion coefficient of the polymer film and resistance to warping, a linear expansion coefficient of a surface of the layer C, which is opposite to the layer A side, is preferably 10 ppm/K to 200 ppm/K, more preferably 20 ppm/K to 150 ppm/K, still more preferably 30 ppm/K to 100 ppm/K, and particularly preferably 40 ppm/K to 80 ppm/K.

The average thickness of the layer A is not particularly limited, but from the viewpoint of dielectric loss tangent of the polymer film and adhesiveness with the metal layer or the metal wire, the average thickness thereof is preferably 5 μm to 90 μm, more preferably 10 μm to 70 μm, and particularly preferably 15 μm to 50 μm.

The average thickness of the layer B is not particularly limited, but from the viewpoint of dielectric loss tangent of the polymer film and adhesiveness with the metal layer or the metal wire, the average thickness thereof is preferably 5 μm to 90 μm, more preferably 10 μm to 70 μm, and particularly preferably 15 μm to 50 μm.

A method for measuring the average thickness of each layer in the above-described polymer film is as follows.

The thickness of each layer is evaluated by cutting the polymer film with a microtome and observing the cross section with an optical microscope. Three or more sites of the cross-sectional sample are cut out, the thickness is measured at three or more points in each cross section, and the average value thereof is defined as the average thickness.

From the viewpoint of dielectric loss tangent of the polymer film and adhesiveness with the metal layer or the metal wire, it is preferable that an average thickness of the layer C is smaller than an average thickness of the layer A, and it is preferable that the average thickness of the layer C is smaller than an average thickness of the layer B.

From the viewpoint of linear expansion coefficient and adhesiveness with the metal layer or the metal wire, a value of $T^A/T^B$, which is a ratio of the average thickness $T^A$ of the layer A to the average thickness $T^B$ of the layer B, is preferably 0.2 to 5, more preferably 0.5 to 2, and particularly preferably 0.8 to 1.2.

From the viewpoint of dielectric loss tangent of the polymer film and adhesiveness with the metal layer or the metal wire, a value of $T^A/T^C$, which is a ratio of the average thickness $T^A$ of the layer A to an average thickness $T^C$ of the layer C, is preferably more than 1, more preferably 2 to 100, still more preferably 2.5 to 20, and particularly preferably 3 to 10.

In addition, from the viewpoint of dielectric loss tangent of the polymer film and adhesiveness with the metal layer or the metal wire, a value of $T^B/T^C$, which is a ratio of the average thickness $T^B$ of the layer B to the average thickness $T^C$ of the layer C, is preferably more than 1, more preferably 2 to 100, still more preferably 2.5 to 20, and particularly preferably 3 to 10.

Furthermore, from the viewpoint of dielectric loss tangent of the polymer film and adhesiveness with the metal layer or the metal wire, the average thickness of the layer C is preferably 0.1 μm to 20 μm, more preferably 0.2 μm to 15 μm, still more preferably 0.5 μm to 10 μm, and particularly preferably 0.5 μm to 8 μm.

From the viewpoint of strength, dielectric loss tangent of the polymer film, and adhesiveness with the metal layer or the metal wire, an average thickness of the above-described polymer film is preferably 6 μm to 200 μm, more preferably 12 μm to 100 μm, and particularly preferably 20 μm to 60 μm.

The average thickness of the polymer film is measured at optional five sites using an adhesive film thickness meter, for example, an electronic micrometer (product name, "KG3001A", manufactured by Anritsu Corporation), and the average value of the measured values is defined as the average thickness of the polymer film.

From the viewpoint of dielectric constant, the dielectric loss tangent of the above-described polymer film is preferably 0.02 or less, more preferably 0.01 or less, still more preferably 0.005 or less, and particularly preferably more than 0 and 0.003 or less.

<Method of Manufacturing Polymer Film>

[Film Formation]

A method of manufacturing the above-described polymer film is not particularly limited, and a known method can be referred to.

Suitable examples of the method of manufacturing the above-described polymer film include a casting method, a coating method, and an extrusion method, and among these, a casting method is particularly preferable. In addition, in a case where the above-described polymer film has a multilayer structure, suitable examples thereof include a co-casting method, a multilayer coating method, and a co-extrusion method. Among these, the co-casting method is particularly preferable for formation of a relatively thin film, and the co-extrusion method is particularly preferable for formation of a thick film.

In a case where the multilayer structure in the polymer film is manufactured by the co-casting method or the multilayer coating method, it is preferable that the co-casting method or the multilayer coating method is performed by using a composition for forming the layer A, a composition for forming the layer B, a composition for forming the layer C, or the like obtained by dissolving or dispersing components of each layer, such as the liquid crystal polymer, in a solvent.

Examples of the solvent include halogenated hydrocarbons such as dichloromethane, chloroform, 1,1-dichloroethane, 1,2-dichloroethane, 1,1,2,2-tetrachloroethane, 1-chlorobutane, chlorobenzene, and o-dichlorobenzene; halogenated phenols such as p-chlorophenol, pentachlorophenol, and pentafluorophenol; ethers such as diethyl ether, tetrahydrofuran, and 1,4-dioxane; ketones such as acetone and cyclohexanone; esters such as ethyl acetate and γ-butyrolactone; carbonates such as ethylene carbonate and propylene carbonate; amines such as triethylamine; nitrogen-containing heterocyclic aromatic compounds such as pyridine; nitriles such as acetonitrile and succinonitrile; amides such as N,N-dimethylformamide, N,N-dimethylacetamide, and N-methylpyrrolidone; urea compounds such as tetramethylurea; nitro compounds such as nitromethane and nitrobenzene; sulfur compounds such as dimethyl sulfoxide and sulfolane; and phosphorus compounds such as hexamethylphosphoramide and tri-n-butyl phosphate. Among these, two or more kinds thereof may be used in combination.

From the viewpoint of low corrosiveness and satisfactory handleability, a solvent containing, as a main component, an aprotic compound, particularly an aprotic compound having no halogen atom is preferable as the solvent, and the proportion of the aprotic compound in the entire solvent is preferably 50% by mass to 100% by mass, more preferably 70% by mass to 100% by mass, and particularly preferably 90% by mass to 100% by mass. In addition, from the viewpoint of easily dissolving the liquid crystal polymer, as the above-described aprotic compound, it is preferable to us an amide such as N,N-dimethylformamide, N,N-dimethylacetamide, tetramethylurea, and N-methylpyrrolidone, or an ester such as γ-butyrolactone; and it is more preferable to use N,N-dimethylformamide, N,N-dimethylacetamide, or N-methylpyrrolidone.

In addition, as the solvent, from the viewpoint of easily dissolving the liquid crystal polymer, a solvent containing a compound having a dipole moment of 3 to 5 as a main component is preferable, and a proportion of the compound having a dipole moment of 3 to 5 in the entire solvent is preferably 50% by mass to 100% by mass, more preferably 70% by mass to 100% by mass, and particularly preferably 90% by mass to 100% by mass.

It is preferable to use the compound having a dipole moment of 3 to 5 as the above-described aprotic compound.

In addition, as the solvent, from the viewpoint of ease removal, a solvent containing, as a main component, a compound having a boiling point of 220° C. or lower at 1 atm is preferable, and a proportion of the compound having a boiling point of 220° C. or lower at 1 atm in the entire solvent is preferably 50% by mass to 100% by mass, more preferably 70% by mass to 100% by mass, and particularly preferably 90% by mass to 100% by mass.

It is preferable to use the compound having a boiling point of 220° C. or lower at 1 atm as the above-described aprotic compound.

In addition, in a case where the polymer film is manufactured by the casting method, co-casting method, coating method, multilayer coating method, extrusion method, co-extrusion method, or the like described above, a support may be used in the method of manufacturing the above-described polymer film. In addition, in a case where the metal layer (metal foil) or the like used in the laminate described later is used as the support, the support may be used as it is without being peeled off.

Examples of the support include a metal drum, a metal band, a glass plate, a resin film, and a metal foil. Among these, a metal drum, a metal band, or a resin film is preferable.

Examples of the resin film include a polyimide (PI) film, and examples of commercially available products thereof include U-PILEX S and U-PILEX R (manufactured by Ube Corporation), KAPTON (manufactured by Du Pont-Toray Co., Ltd.), and IF30, IF70, and LV300 (manufactured by SKC Kolon PI, Inc.).

In addition, the support may have a surface treatment layer formed on the surface so that the support can be easily peeled off. Hard chrome plating, a fluororesin, or the like can be used as the surface treatment layer.

An average thickness of the resin film support is not particularly limited, but is preferably 25 μm or more and 75 μm or less and more preferably 50 μm or more and 75 μm or less.

In addition, a method for removing at least a part of the solvent from a cast or applied film-like composition (a casting film or a coating film) is not particularly limited, and a known drying method can be used.

[Stretching]

In the above-described polymer film, stretching can be combined as appropriate from the viewpoint of controlling molecular alignment and adjusting thermal expansion coefficient and mechanical properties. The stretching method is not particularly limited, and a known method can be referred to, and the stretching method may be carried out in a solvent-containing state or in a dry film state. The stretching in the solvent-containing state may be carried out by gripping and stretching the film, or may be carried out by utilizing self-contraction due to drying without stretching. The stretching is particularly effective for the purpose of improving the breaking strength, in a case where brittleness of the film is reduced by addition of an inorganic filler or the like.

In addition, the method of manufacturing the above-described polymer film may optionally include a step of polymerizing with light or heat.

A light irradiation unit and a heat application unit are not particularly limited, and a known light irradiation unit such as a metal halide lamp and a known heat application unit such as a heater can be used.

Light irradiation conditions and heat application conditions are not particularly limited, and the polymerization can be carried out at a desired temperature and time and in a known atmosphere.

[Heat Treatment]

The above-described polymer film may be subjected to heat treatment (annealing).

From the viewpoint of mechanical strength of the web during the manufacturing process, and dimensional change, breaking strength, or the like of the polymer film to be manufactured, a heat treatment temperature in the above-described heat treatment step is preferably a temperature equal to or higher than the glass transition temperature Tg of the polymer having a dielectric loss tangent of 0.01 or less or a temperature lower than the melting point Tm thereof.

Furthermore, specifically, from the viewpoint of breaking strength, the above-described heat treatment temperature is preferably 260° C. to 370° C., and more preferably 310° C. to 350° C. The annealing time is preferably 30 minutes to 5 hours, and more preferably 30 minutes to 3 hours.

In addition, the method of manufacturing the polymer film according to the embodiment of the present disclosure may include other known steps as necessary.

In addition, the laminate according to the embodiment of the present disclosure may include a layer other than those described above.

For example, the laminate according to the embodiment of the present disclosure may be a laminate including a polymer film in which a linear expansion coefficient of at least one surface X is smaller than a linear expansion coefficient of an inside, a metal layer or a metal wire, which is provided on a surface Y side opposite to the surface X of the polymer film, and another polymer film.

Another polymer film described above may be the polymer film according to the embodiment of the present disclosure or another polymer film different from the polymer film according to the embodiment of the present disclosure, but the polymer film according to the embodiment of the present disclosure is preferable.

<Applications>

The laminate according to the embodiment of the present disclosure can be used for various applications. Among the various applications, the laminate can be used suitably for an electronic component such as a printed wiring board and more suitably for a flexible printed circuit board.

(Polymer Film)

In the polymer film according to the embodiment of the present disclosure, a linear expansion coefficient of at least one surface X is smaller than a linear expansion coefficient of an inside.

Preferred aspects of the polymer film according to the embodiment of the present disclosure are the same as the preferred aspect of the polymer film in the laminate according to the embodiment of the present disclosure described above.

<Applications>

The polymer film according to the embodiment of the present disclosure can be used for various applications. Among the various applications, the polymer film can be used suitably as a film for an electronic component such as a printed wiring board and more suitably for a flexible printed circuit board.

In addition, the polymer film according to the embodiment of the present disclosure can be suitably used as a polymer film for metal adhesion.

EXAMPLES

Hereinafter, the present disclosure will be described in more detail with reference to examples. The materials, the used amounts, the proportions, the treatment contents, the treatment procedures, and the like described in the following examples can be appropriately changed without departing from the gist of the present disclosure. Therefore, the scope of the present disclosure is not limited to the following specific examples.

<<Measurement Method>>
[Linear Expansion Coefficient]

A tensile load of 1 g was applied to both ends of a film having a width of 5 mm and a length of 20 mm, and a linear expansion coefficient was calculated from the inclination of TMA curve between 30° C. and 150° C. using a thermomechanical analyzer (TMA) in a case where the temperature was raised from 25° C. to 200° C. at a rate of 5° C./min, lowered to 30° C. at a rate of 20° C./min, and raised again at a rate of 5° C./min. In a case where a metal foil was attached to the film, the evaluation was performed after removing the film with ferric chloride.

In addition, in a case where each layer or each surface was measured, a measurement sample was produced by scraping off the layer or surface to be measured with a razor or the like.

[Breaking Strength]

A sample of 150 mm×10 mm was cut out from the produced film, and using a universal tensile tester "STM T50BP" manufactured by Toyo Baldwin Co., Ltd., a stress against elongation was measured at a tensile rate of 10%/min in an atmosphere of 25° C. and 60% RH, thereby obtaining an elastic modulus from a slope of an elongation range of 0.1% to 0.5%. In a case where a metal foil was attached to the film, the evaluation was performed after removing the film with ferric chloride.

Production Example

<Polymer>

LC-A: Liquid crystal polymer produced by production method described below

—Production of LC-A—

940.9 g (5.0 mol) of 6-hydroxy-2-naphthoic acid, 377.9 g (2.5 mol) of 4-hydroxyacetaminophen, 415.3 g (2.5 mol) of isophthalic acid, and 867.8 g (8.4 mol) of acetic acid anhydride were added to a reactor provided with a stirrer, a torque meter, a nitrogen gas introduction pipe, a thermometer, and a reflux condenser, the gas inside the reactor was replaced with nitrogen gas, and the mixture was heated from room temperature (23° C.) to 140° C. over 60 minutes while being stirred in a nitrogen gas stream and was refluxed at 140° C. for 3 hours.

Thereafter, the mixture was heated from 150° C. to 300° C. over 5 hours while distilling off by-product acetic acid and unreacted acetic acid anhydride and maintained at 300° C. for 30 minutes, and the resultant was taken out from the reactor and cooled to room temperature. The obtained solid matter was crushed with a crusher, thereby obtaining powdery liquid crystal polyester (A1). The flow start temperature of the liquid crystal polyester (A1) was 193.3° C.

The liquid crystal polyester (A1) obtained above was heated from room temperature to 160° C. over 2 hours and 20 minutes in a nitrogen atmosphere, further heated from 160° C. to 180° C. over 3 hours and 20 minutes, maintained at 180° C. for 5 hours to carry out solid phase polymerization, cooled, and crushed with a crusher, thereby obtaining powdery liquid crystal polyester (A2). The flow start temperature of the liquid crystal polyester (A2) was 220° C.

The liquid crystal polyester (A2) obtained above was heated from room temperature (23° C.) to 180° C. over 1 hour and 25 minutes in a nitrogen atmosphere, further heated from 180° C. to 255° C. over 6 hours and 40 minutes, maintained at 255° C. for 5 hours to carry out solid phase polymerization, and cooled, thereby obtaining powdery liquid crystal polyester (A) (LC-A). A flow start temperature of the liquid crystal polyester (A) was 302° C. In addition, in a case where a melting point of the liquid crystal polyester (A) was measured using a differential scanning calorimetry device, the measured value was 311° C.

LC-B: Liquid crystal polymer produced by production method described below

—Production of LC-B—

940.9 g (5.0 mol) of 6-hydroxy-2-naphthoic acid, 377.9 g (2.5 mol) of 4-hydroxyacetaminophen, 415.3 g (2.5 mol) of isophthalic acid, and 867.8 g (8.4 mol) of acetic acid anhydride were added to a reactor provided with a stirrer, a torque meter, a nitrogen gas introduction pipe, a thermometer, and a reflux condenser, the gas inside the reactor was replaced with nitrogen gas, and the mixture was heated from room temperature (23° C.) to 143° C. over 60 minutes while being stirred in a nitrogen gas stream and was refluxed at 143° C. for 1 hour.

Thereafter, the mixture was heated from 150° C. to 300° C. over 5 hours while distilling off by-product acetic acid and unreacted acetic acid anhydride and maintained at 300° C. for 30 minutes, and the resultant was taken out from the reactor and cooled to room temperature. The obtained solid matter was crushed with a crusher, thereby obtaining powdery liquid crystal polyester (B1).

The liquid crystal polyester (B1) obtained above was heated from room temperature to 160° C. over 2 hours and 20 minutes in a nitrogen atmosphere, further heated from 160° C. to 180° C. over 3 hours and 20 minutes, maintained at 180° C. for 5 hours to carry out solid phase polymerization, cooled, and crushed with a crusher, thereby obtaining powdery liquid crystal polyester (B2).

The liquid crystal polyester (B2) obtained above was heated from room temperature (23° C.) to 180° C. over 1 hour and 20 minutes in a nitrogen atmosphere, further heated from 180° C. to 240° C. over 5 hours, maintained at 240° C. for 5 hours to carry out solid phase polymerization, and cooled, thereby obtaining powdery liquid crystal polyester (C) (LC-B).

<Filler>

F-1: Commercially available hydrophobic silica having an average primary particle diameter of 20 nm (NX90S (surface-treated with hexamethyldisilazane), manufactured by Nippon Aerosil Co., Ltd.) was used so that the amount of solid content was the amount shown in Table 1.

F-2: Liquid crystal polymer particles produced by production method described below —Production of LC-C—

1034.99 g (5.5 mol) of 2-hydroxy-6-naphthoic acid, 378.33 g (1.75 mol) of 2,6-naphthalenedicarboxylic acid, 83.07 g (0.5 mol) of terephthalic acid, 272.52 g (2.475 mol; 0.225 mol excess with respect to the total molar amount of 2,6-naphthalenedicarboxylic acid and terephthalic acid) of hydroquinone, 1226.87 g (12 mol) of acetic acid anhydride, and 0.17 g of 1-methylimidazole as a catalyst were added to a reactor provided with a stirrer, a torque meter, a nitrogen gas introduction pipe, a thermometer, and a reflux condenser. After the gas in the reactor was replaced with nitrogen gas, the mixture was heated from room temperature to 145° C. over 15 minutes while being stirred in a nitrogen gas stream and was refluxed at 145° C. for 1 hour.

Next, the mixture was heated from 145° C. to 310° C. over 3 hours 30 minutes while distilling off by-product acetic acid and unreacted acetic acid anhydride and maintained at 310° C. for 3 hours, and solid liquid crystal polyester (LC-C) was taken out and cooled to room temperature. A flow start temperature of the polyester (LC-C) was 265° C.

[Production of Liquid Crystal Polyester Particles (F-1)]

Using a jet mill ("KJ-200" manufactured by KURIMOTO Ltd.), the liquid crystal polyester (LC-C) was crushed to obtain liquid crystal polyester particles (F-2). An average particle diameter of the liquid crystal polyester particles was 9 μm.

F-3: Commercially available silica particles having an average particle diameter of 0.5 μm (SO—C2, manufactured by Admatechs) were used so that the amount of solid content was the amount shown in Table 1.

F-4: Commercially available hollow powder having an average particle diameter of 16 μm (glass bubbles iM30K, manufactured by 3M Japan Limited)

F-5: Boron nitride particles (melting point >500° C., HP40MF100 (manufactured by Mizushima Ferroalloy Co., Ltd.), dielectric loss tangent: 0.0007)

<Curable Compound>

M-1: Commercially available aminophenol-type epoxy resin (jER630LSD, manufactured by Mitsubishi Chemical Corporation.) was used so that the amount of solid content was the amount shown in Table 1.

M-2: Commercially available low dielectric adhesive (varnish of SLK (manufactured by Shin-Etsu Chemical Co., Ltd.) containing mainly a polymer-type curable compound was used so that the amount of solid content was the amount shown in Table 1)

<Film Formation>

A film was formed according to the following casting.

[Co-Casting a (Solution Film Formation)]

—Preparation of Polymer Solution—

The above-described polymer and the additive were added to N-methylpyrrolidone, and the mixture was stirred at 140° C. for 4 hours in a nitrogen atmosphere, thereby obtaining a polymer solution. The polymer and the additive were added at the volume ratios shown in Table 1, and a polymer concentration with respect to N-methylpyrrolidone was 9% by mass for the solution for the layer B (layer on the air interface side) and 8% by mass for the solutions for the layer A and the layer C.

Subsequently, first, the solution was allowed to pass through a sintered fiber metal filter having a nominal pore diameter of 10 μm and allowed to pass through a sintered fiber metal filter having the same nominal pore diameter of 10 thereby obtaining each polymer solution.

In a case where the additive was not dissolved in N-methylpyrrolidone, a liquid crystal polymer solution was prepared without adding the additive, the mixture was allowed to pass through the above-described sintered fiber metal filter, and then the additive was added thereto and stirred.

—Preparation of Single-Sided Copper-Clad Laminated Plate—

The obtained polymer solutions were fed to a casting die equipped with a feedblock adapted for three-layer co-casting, and cast onto a treated surface of a copper foil (manufactured by FUKUDA METAL FOIL & POWER CO., LTD., CF-T4X-SV-12, average thickness: 12 surface roughness Rz of the treated surface: 1.2 μm) so that the layer A or the layer C was in contact with the copper foil. The polymer solutions were dried at 40° C. for 4 hours to remove the solvent from the casting film, a laminate (single-sided copper-clad laminated plate) having a copper layer and a film was obtained.

[Co-Casting B (Solution Film Formation)]

Co-casting was performed in the same manner as the co-casting A, except that, in the above-described co-casting A, the copper foil for casting the polymer solution was changed from CF-T4X-SV-12 (manufactured by FUKUDA METAL FOIL & POWER CO., LTD., average thickness: 12 μm, surface roughness Rz of the treated surface: 1.2 μm) to a treated surface of CF-T9DA-SV-12 (manufactured by FUKUDA METAL FOIL & POWER CO., LTD., average thickness: 12 surface roughness Rz of the treated surface: 0.8 μm).

[Single Layer Casting (Solution Film Formation)]

—Preparation of Polymer Solution—

The above-described polymer and the additive were added to N-methylpyrrolidone, and the mixture was stirred at 140° C. for 4 hours in a nitrogen atmosphere, thereby obtaining a polymer solution. The polymer and the additive were added at the volume ratios shown in Table 1, and the concentration of solid contents was 23% by mass.

Subsequently, first, the solution was allowed to pass through a sintered fiber metal filter having a nominal pore diameter of 10 μm and allowed to pass through a sintered fiber metal filter having the same nominal pore diameter of 10 μm, thereby obtaining each polymer solution.

In a case where the additive was not dissolved in N-methylpyrrolidone, a liquid crystal polymer solution was prepared without adding the additive, the mixture was allowed to pass through the above-described sintered fiber metal filter, and then the additive was added thereto and stirred.

—Preparation of Single-Sided Copper-Clad Laminated Plate—

The obtained polymer solution was fed to a single-layer type casting die and cast onto a treated surface of a copper foil (CF-T4X-SV-12, manufactured by FUKUDA METAL FOIL & POWER CO., LTD., average thickness: 12 μm). The polymer solution was dried at 40° C. for 4 hours to remove the solvent from the casting film, a laminate (single-sided copper-clad laminated plate) having a copper layer and a film was obtained.

<Annealing Step>

The single-sided copper-clad laminated plate obtained above was further heated in a nitrogen atmosphere from room temperature (25° C.) to 270° C. at 1° C./min, and a heat treatment was performed at the temperature for 2 hours to produce a single-sided copper-clad laminated plate.

<Warping>

The above-described single-sided copper-clad laminated plate was cut out at a square of 100 mm in an oblique direction of 45°, an amount of floating at four corners was measured, and an average value thereof was evaluated according to the following standard.

A: The amount of floating was less than 5 mm.
B: The amount of floating was 5 mm or more.
C: The amount of floating was 5 mm or more, and a rising angle was more than 90°.

TABLE 1

| | Layer B (surface X side) | | | | | Layer A (inner layer or surface Y side) | | | | |
|---|---|---|---|---|---|---|---|---|---|---|
| | Polymer having dielectric loss tangent of 0.01 or less | | Additive | | Linear expansion coefficient (ppm/K) | Thickness (μm) | Polymer having dielectric loss tangent of 0.01 or less | | Additive | | Linear expansion coefficient (ppm/K) |
| | Type | Content (% by volume) | Type | Content (% by volume) | | | Type | Content (% by volume) | Type | Content (% by volume) | |
| Example 1 | LC-A | 60 | F-1 | 40 | 25 | 25 | LC-A | 100 | — | — | 60 |
| Example 2 | LC-A | 60 | F-1 | 40 | 25 | 15 | LC-A | 100 | — | — | 60 |
| Example 3 | LC-B | 60 | F-3 | 40 | 29 | 25 | LC-B | 100 | — | — | 32 |
| Example 4 | LC-B | 60 | F-3 | 40 | 29 | 25 | LC-B | 25 | F-2 | 75 | 70 |
| Example 5 | LC-B | 60 | F-3 | 40 | 29 | 25 | LC-B | 50 | F-2 | 50 | 55 |
| Example 6 | LC-B | 60 | F-3 | 40 | 29 | 25 | LC-B | 50 | F-2 | 50 | 55 |
| Example 7 | LC-B | 60 | F-3 | 40 | 29 | 25 | LC-B | 50 | F-2 | 50 | 55 |
| Example 8 | LC-B | 60 | F-4 | 40 | 29 | 25 | LC-B | 50 | F-2 | 50 | 55 |
| Example 9 | LC-B | 60 | F-5 | 40 | 29 | 25 | LC-B | 50 | F-2 | 50 | 55 |
| Comparative Example 1 | — | — | — | — | — | — | LC-A | 100 | — | — | 60 |
| Comparative Example 2 | — | — | — | — | — | — | LC-A | 60 | F-1 | 40 | 25 |
| Comparative Example 3 | LC-B | 25 | F-2 | 75 | 70 | 25 | LC-B | 60 | F-3 | 40 | 29 |

TABLE 1-continued

| | Layer A (inner layer or surface Y side) Thickness (μm) | Layer C (surface Y side) | | | | | | Evaluation result | |
|---|---|---|---|---|---|---|---|---|---|
| | | Polymer having dielectric loss tangent of 0.01 or less | | Additive | | Linear expansion coefficient (ppm/K) | Thickness (μm) | Film forming method | Polymer film Breaking strength (%) | Laminate Resistance to warping |
| | | Type | Content (% by volume) | Type | Content (% by volume) | | | | | |
| Example 1 | 24 | LC-A | 100 | — | — | 60 | 1 | Co-casting A | 30 | A |
| Example 2 | 35 | — | — | — | — | — | — | Co-casting A | 30 | B |
| Example 3 | 25 | — | — | — | — | — | — | Co-casting A | 30 | A |
| Example 4 | 25 | — | — | — | — | — | — | Co-casting A | 20 | B |
| Example 5 | 25 | — | — | — | — | — | — | Co-casting A | 20 | A |
| Example 6 | 22 | LC-B | 95 | M-1 | 5 | 32 | 3 | Co-casting B | 20 | A |
| Example 7 | 22 | LC-B | 95 | M-2 | 5 | 32 | 3 | Co-casting B | 20 | A |
| Example 8 | 25 | — | — | — | — | — | — | Co-casting A | 20 | A |
| Example 9 | 25 | — | — | — | — | — | — | Co-casting A | 20 | A |
| Comparative Example 1 | 50 | — | — | — | — | — | — | Single layer casting | 40 | C |
| Comparative Example 2 | 50 | — | — | — | — | — | — | Single layer casting | 1 | A |
| Comparative Example 3 | 25 | — | — | — | — | — | — | Co-casting | 20 | C |

As shown in Table 1, in Examples 1 to 9, the breaking strength of the polymer film and the warping of the copper-clad laminated plate (laminate) were good.

The disclosure of Japanese Patent Application No. 2020-211786 filed on Dec. 21, 2020 is incorporated in the present specification by reference.

All documents, patent applications, and technical standards described in the present specification are incorporated herein by reference to the same extent as in a case of being specifically and individually noted that individual documents, patent applications, and technical standards are incorporated by reference.

What is claimed is:

1. A laminate comprising:
   a polymer film comprising a layer A, and a layer B provided on at least one surface of the layer A,
   wherein the layer B includes an inorganic filler and a surface X opposite to the layer A, and the layer A includes a filler and a surface Y opposite to the layer B,
   a linear expansion coefficient of the surface X of the layer B is smaller than a linear expansion coefficient of the surface Y of the layer A, and a content of the filler in the layer A is higher than a content of the inorganic filler in the layer B; and
   a metal layer or a metal wire is provided on the surface Y of the layer A opposite to the surface X of the layer B of the polymer film.

2. The laminate according to claim 1,
   wherein a thermal expansion coefficient of the surface X is -20 ppm/K to 50 ppm/K.

3. The laminate according to claim 1,
   wherein a thermal expansion coefficient of the surface Y is 10 ppm/K to 200 ppm/K.

4. The laminate according to claim 1,
   wherein each of the layer A and the layer B of the polymer film contains a polymer having a dielectric loss tangent of 0.01 or less.

5. The laminate according to claim 4,
   wherein the polymer having a dielectric loss tangent of 0.01 or less is a liquid crystal polymer.

6. The laminate according to claim 5,
wherein the polymer having a dielectric loss tangent of 0.01 or less includes a liquid crystal polymer having a structural unit represented by any of Formulae (1) to (3), —O—Ar$^1$—CO—                                 Formula (1)

—CO—Ar$^2$—CO—                          Formula (2)

—X—Ar$^3$—Y—                                      Formula (3)

in Formulae (1) to (3), Ar$^1$ represents a phenylene group, a naphthylene group, or a biphenylylene group, Ar$^2$ and Ar$^3$ each independently represent a phenylene group, a naphthylene group, a biphenylylene group, or a group represented by Formula (4), X and Y each independently represent an oxygen atom or an imino group, and hydrogen atoms in Ar$^1$ to Ar$^3$ may be each independently substituted with a halogen atom, an alkyl group, or an aryl group, —Ar$^4$—Z—Ar$^5$—                            Formula (4)

in Formula (4), Ar$^4$ and Ar$^5$ each independently represent a phenylene group or a naphthylene group, and Z represents an oxygen atom, a sulfur atom, a carbonyl group, a sulfonyl group, or an alkylene group.

7. The laminate according to claim 4,
wherein a melting point Tm or a 5%-by-mass-loss temperature Td of the polymer having a dielectric loss tangent of 0.01 or less is 200° C. or higher.

8. The laminate according to claim 1,
wherein a peel strength between the polymer film and the metal layer or the metal wire is 0.5 kN/m or more.

9. A polymer film comprising,
a layer A, and a layer B provided on at least one surface of the layer A,
wherein the layer B includes an inorganic filler and a surface X opposite to the layer A, the layer A includes a filler and a surface Y opposite to the layer B, a linear expansion coefficient of the surface X of the layer B is smaller than a linear expansion coefficient of the surface Y of the layer A, and a content of the filler in the layer A is higher than a content of the inorganic filler in the layer B.

10. The polymer film according to claim 9,
wherein a thermal expansion coefficient of the surface X is -20 ppm/K to 50 ppm/K.

11. The polymer film according to claim 9,
wherein each of the layer A and the layer B of the polymer film contains a polymer having a dielectric loss tangent of 0.01 or less.

12. The polymer film according to claim 11,
wherein the polymer having a dielectric loss tangent of 0.01 or less is a liquid crystal polymer.

13. The polymer film according to claim 12,
wherein the polymer having a dielectric loss tangent of 0.01 or less includes a liquid crystal polymer having a structural unit represented by any of Formulae (1) to (3), —O—Ar$^1$—CO—                                 Formula (1)

—CO—Ar$^2$—CO—                          Formula (2)

—X—Ar$^3$—Y—                                      Formula (3)

in Formulae (1) to (3), Ar$^1$ represents a phenylene group, a naphthylene group, or a biphenylylene group, Ar$^2$ and Ar$^3$ each independently represent a phenylene group, a naphthylene group, a biphenylylene group, or a group represented by Formula (4), X and Y each independently represent an oxygen atom or an imino group, and hydrogen atoms in Ar$^1$ to Ar$^3$ may be each independently substituted with a halogen atom, an alkyl group, or an aryl group, —Ar$^4$—Z—Ar$^5$—                            Formula (4)

in Formula (4), Ar$^4$ and Ar$^5$ each independently represent a phenylene group or a naphthylene group, and Z represents an oxygen atom, a sulfur atom, a carbonyl group, a sulfonyl group, or an alkylene group.

14. The polymer film according to claim 11,
wherein a melting point Tm or a 5%-by-mass-loss temperature Td of the polymer having a dielectric loss tangent of 0.01 or less is 200° C. or higher.

\* \* \* \* \*